(12) United States Patent
Gargac et al.

(10) Patent No.: US 12,496,135 B2
(45) Date of Patent: Dec. 16, 2025

(54) MIXED-REALITY HUMERAL-HEAD SIZING AND PLACEMENT

(71) Applicant: Howmedica Osteonics Corp., Mahwah, NJ (US)

(72) Inventors: Shawn Gargac, Fort Wayne, IN (US); Paul Feng, St. Paul, MN (US)

(73) Assignee: Howmedica Osteonics Corp., Mahwah, NJ (US)

( * ) Notice: Subject to any disclaimer, the term of this patent is extended or adjusted under 35 U.S.C. 154(b) by 472 days.

(21) Appl. No.: 17/995,473

(22) PCT Filed: Feb. 2, 2021

(86) PCT No.: PCT/US2021/016235
§ 371 (c)(1),
(2) Date: Oct. 4, 2022

(87) PCT Pub. No.: WO2021/221749
PCT Pub. Date: Nov. 4, 2021

(65) Prior Publication Data
US 2023/0146371 A1    May 11, 2023

Related U.S. Application Data

(60) Provisional application No. 63/017,428, filed on Apr. 29, 2020.

(51) Int. Cl.
*A61B 34/10* (2016.01)
*A61B 34/20* (2016.01)
(Continued)

(52) U.S. Cl.
CPC ........ *A61B 34/10* (2016.02); *A61B 2034/102* (2016.02); *A61B 2034/105* (2016.02);
(Continued)

(58) Field of Classification Search
CPC .............. A61B 34/10; A61B 2034/102; A61B 2034/108; A61B 2034/2074;
(Continued)

(56) References Cited

U.S. PATENT DOCUMENTS 8,482,859 B2    7/2013    Border et al.
8,512,346 B2    8/2013    Couture
(Continued)

FOREIGN PATENT DOCUMENTS

CA    3203261 A1    7/2022
EP    3125759 B1    1/2021
(Continued)

OTHER PUBLICATIONS

Traub et al., "Advanced Display and Visualization Concepts for Image Guided Surgery," Journal of Display Technology, vol. 4, No. 4, Dec. 2008, 8 pp.
(Continued)

*Primary Examiner* — Kevin T Truong
*Assistant Examiner* — Diana Jones
(74) *Attorney, Agent, or Firm* — Shumaker & Sieffert, P.A.

(57) ABSTRACT

Techniques are described for guiding a joint replacement surgery. In some examples, a system includes a visualization device comprising one or more sensors; and processing circuitry configured to determine, based on data generated by the one or more sensors, one or more size parameters of a bone resection surface viewable via the visualization device; select, based on the one or more size parameters of the bone resection surface and from a plurality of implants, an implant; and output for display, via the visualization device, a graphical representation of the selected implant relative to the bone resection surface.

21 Claims, 10 Drawing Sheets

(51) Int. Cl.
  *A61B 90/00* (2016.01)
  *G02B 27/01* (2006.01)
(52) U.S. Cl.
  CPC . *A61B 2034/108* (2016.02); *A61B 2034/2074* (2016.02); *A61B 2090/365* (2016.02); *A61B 2090/368* (2016.02); *G02B 2027/0174* (2013.01)
(58) Field of Classification Search
  CPC ........ A61B 2090/365; A61B 2090/368; G02B 2027/0174
  See application file for complete search history.

(56) References Cited

U.S. PATENT DOCUMENTS

| | | | |
|---|---|---|---|
| 8,971,606 B2 | 3/2015 | Chaoui et al. | |
| 9,123,155 B2 | 9/2015 | Cunningham et al. | |
| 9,498,132 B2 | 11/2016 | Maier-Hein et al. | |
| 9,681,925 B2 | 6/2017 | Azar et al. | |
| 9,861,446 B2 | 1/2018 | Lang | |
| 9,980,780 B2 | 5/2018 | Lang | |
| 10,010,379 B1 | 7/2018 | Gibby et al. | |
| 10,013,808 B2 | 7/2018 | Jones et al. | |
| 10,016,243 B2 | 7/2018 | Esterberg | |
| 10,052,170 B2 | 8/2018 | Saget et al. | |
| 10,159,530 B2 | 12/2018 | Lang | |
| 10,194,990 B2 | 2/2019 | Amanatullah et al. | |
| 10,258,427 B2 | 4/2019 | Saget et al. | |
| 10,278,777 B1 | 5/2019 | Lang | |
| 10,292,768 B2 | 5/2019 | Lang | |
| 10,368,947 B2 | 8/2019 | Lang | |
| 10,398,514 B2 | 9/2019 | Ryan et al. | |
| 10,405,927 B1 | 9/2019 | Lang | |
| 10,467,752 B2 | 11/2019 | Tanji | |
| 10,499,996 B2 | 12/2019 | de Almeida Barreto | |
| 10,546,423 B2 | 1/2020 | Jones et al. | |
| 10,548,667 B2 | 2/2020 | Flett et al. | |
| 10,580,217 B2 | 3/2020 | Jones et al. | |
| 10,603,113 B2 | 3/2020 | Lang | |
| 10,646,283 B2 | 5/2020 | Johnson et al. | |
| 10,646,285 B2 | 5/2020 | Siemionow et al. | |
| 10,650,594 B2 | 5/2020 | Jones et al. | |
| 10,687,901 B2 | 6/2020 | Thomas | |
| 10,743,939 B1 | 8/2020 | Lang | |
| 10,799,296 B2 | 10/2020 | Lang | |
| 10,806,518 B2 | 10/2020 | Amanatullah | |
| 10,813,700 B2 | 10/2020 | Amanatullah | |
| 10,818,199 B2 | 10/2020 | Buras et al. | |
| 10,825,563 B2 | 11/2020 | Gibby et al. | |
| 10,846,851 B2 | 11/2020 | Boettger et al. | |
| 10,849,693 B2 | 12/2020 | Lang | |
| 10,861,236 B2 | 12/2020 | Geri et al. | |
| 10,987,176 B2 | 4/2021 | Poltaretskyi et al. | |
| 10,987,190 B2 | 4/2021 | Flossmann et al. | |
| 11,013,560 B2 | 5/2021 | Lang | |
| 11,062,522 B2 | 7/2021 | Jones et al. | |
| 11,071,590 B2 | 7/2021 | Moctezuma De la Barrera | |
| 11,080,934 B2 | 8/2021 | Tseng et al. | |
| 11,103,311 B2 | 8/2021 | May et al. | |
| 11,135,016 B2 | 10/2021 | Frielinghaus et al. | |
| 11,153,555 B1 | 10/2021 | Healy et al. | |
| 11,172,990 B2 | 11/2021 | Lang | |
| 11,172,996 B1 | 11/2021 | Qian et al. | |
| 11,176,750 B2 | 11/2021 | Jones et al. | |
| 11,202,675 B2 | 12/2021 | Uhde et al. | |
| 11,207,150 B2 | 12/2021 | Healy et al. | |
| 11,217,028 B2 | 1/2022 | Jones et al. | |
| 11,237,627 B2 | 2/2022 | Gibby et al. | |
| 11,253,321 B2 | 2/2022 | Amanatullah | |
| 11,287,874 B2 | 3/2022 | Gibby et al. | |
| 11,302,005 B2 | 4/2022 | Tanji | |
| 11,311,341 B2 | 4/2022 | Lang | |
| 11,357,576 B2 | 6/2022 | Jo et al. | |
| 11,382,699 B2 | 7/2022 | Wassall et al. | |
| 11,382,713 B2 | 7/2022 | Healy et al. | |
| 11,413,094 B2 | 8/2022 | Qiu et al. | |
| 11,439,469 B2 | 9/2022 | Poltaretskyi et al. | |
| 11,452,568 B2 | 9/2022 | Lang | |
| 11,457,982 B2 | 10/2022 | Marti et al. | |
| 11,461,983 B2 | 10/2022 | Jones et al. | |
| 11,510,750 B2 | 11/2022 | Dulin et al. | |
| 11,532,135 B2 | 12/2022 | Geri et al. | |
| 11,571,263 B2 | 2/2023 | Moore et al. | |
| 11,589,923 B2 | 2/2023 | Running et al. | |
| 11,589,927 B2 | 2/2023 | Oezbek et al. | |
| 11,602,395 B2 | 3/2023 | Lang | |
| 11,607,277 B2 | 3/2023 | Calloway et al. | |
| 11,622,818 B2 | 4/2023 | Siemionow et al. | |
| 11,638,613 B2 | 5/2023 | Murphy | |
| 11,645,531 B2 | 5/2023 | Moore et al. | |
| 11,690,697 B2 | 7/2023 | Healy et al. | |
| 11,730,544 B2 | 8/2023 | Moctezuma De la Barrera | |
| 11,734,901 B2 | 8/2023 | Jones et al. | |
| 11,751,944 B2 | 9/2023 | Lang | |
| 11,763,531 B2 | 9/2023 | Jones et al. | |
| 11,766,296 B2 | 9/2023 | Wolf et al. | |
| 11,839,433 B2 | 12/2023 | Schaewe et al. | |
| 11,850,003 B2 | 12/2023 | Lang | |
| 2006/0184454 A1 | 8/2006 | Ananda | |
| 2017/0027651 A1 | 2/2017 | Esterberg | |
| 2017/0258526 A1* | 9/2017 | Lang ................ A61B 17/1742 |
| 2017/0312032 A1 | 11/2017 | Amanatullah et al. | |
| 2018/0049622 A1 | 2/2018 | Ryan et al. | |
| 2018/0140362 A1 | 5/2018 | Cali et al. | |
| 2019/0053851 A1 | 2/2019 | Siemionow et al. | |
| 2019/0380792 A1* | 12/2019 | Poltaretskyi ........... G06N 3/045 |
| 2020/0038112 A1 | 2/2020 | Amanatullah et al. | |
| 2020/0229877 A1 | 7/2020 | Siemionow et al. | |
| 2020/0246074 A1 | 8/2020 | Lang | |
| 2020/0246081 A1 | 8/2020 | Johnson et al. | |
| 2020/0390503 A1 | 12/2020 | Casas et al. | |
| 2021/0015559 A1 | 1/2021 | Mahfouz | |
| 2021/0022808 A1 | 1/2021 | Lang | |
| 2021/0090344 A1 | 3/2021 | Geri et al. | |
| 2021/0093388 A1 | 4/2021 | Poltaretskyi et al. | |
| 2021/0093389 A1 | 4/2021 | Poltaretskyi et al. | |
| 2021/0093390 A1 | 4/2021 | Poltaretskyi et al. | |
| 2021/0093392 A1 | 4/2021 | Poltaretskyi et al. | |
| 2021/0121237 A1 | 4/2021 | Fanson et al. | |
| 2021/0169578 A1 | 6/2021 | Calloway et al. | |
| 2021/0169581 A1 | 6/2021 | Calloway et al. | |
| 2021/0169605 A1 | 6/2021 | Calloway et al. | |
| 2021/0241534 A1 | 8/2021 | Avisar et al. | |
| 2021/0251717 A1 | 8/2021 | Healy et al. | |
| 2021/0267698 A1 | 9/2021 | Siemionow et al. | |
| 2021/0327304 A1 | 10/2021 | Buras et al. | |
| 2021/0338337 A1 | 11/2021 | Calloway et al. | |
| 2021/0346115 A1 | 11/2021 | Dulin et al. | |
| 2021/0361358 A1 | 11/2021 | May et al. | |
| 2021/0369353 A1 | 12/2021 | Nikou et al. | |
| 2022/0007006 A1 | 1/2022 | Healy et al. | |
| 2022/0008135 A1 | 1/2022 | Frielinghaus et al. | |
| 2022/0012949 A1 | 1/2022 | Jones et al. | |
| 2022/0020219 A1 | 1/2022 | Chav et al. | |
| 2022/0039868 A1 | 2/2022 | Chaoui et al. | |
| 2022/0039881 A1 | 2/2022 | Avisar et al. | |
| 2022/0051483 A1 | 2/2022 | Nevins et al. | |
| 2022/0051484 A1 | 2/2022 | Jones et al. | |
| 2022/0054195 A1 | 2/2022 | Chaoui et al. | |
| 2022/0059212 A1 | 2/2022 | Chaoui et al. | |
| 2022/0059213 A1 | 2/2022 | Chaoui et al. | |
| 2022/0071729 A1 | 3/2022 | Healy et al. | |
| 2022/0079675 A1 | 3/2022 | Lang | |
| 2022/0084298 A1 | 3/2022 | Jones et al. | |
| 2022/0087749 A1 | 3/2022 | Marti et al. | |
| 2022/0117669 A1 | 4/2022 | Nikou et al. | |
| 2022/0125519 A1 | 4/2022 | Slagmolen et al. | |
| 2022/0148167 A1 | 5/2022 | Poltaretskyi et al. | |
| 2022/0148168 A1 | 5/2022 | Poltaretskyi et al. | |
| 2022/0151704 A1 | 5/2022 | Nikou | |
| 2022/0151705 A1 | 5/2022 | Nikou et al. | |
| 2022/0155854 A1 | 5/2022 | Gibby et al. | |
| 2022/0156924 A1 | 5/2022 | Poltaretskyi et al. | |

(56) References Cited

U.S. PATENT DOCUMENTS

| | | |
|---|---|---|
| 2022/0156942 A1 | 5/2022 | Chaoui et al. |
| 2022/0160439 A1 | 5/2022 | Ryan et al. |
| 2022/0168051 A1 | 6/2022 | Ryan et al. |
| 2022/0192776 A1 | 6/2022 | Gibby et al. |
| 2022/0202493 A1 | 6/2022 | Gibby et al. |
| 2022/0218420 A1 | 7/2022 | Qian et al. |
| 2022/0226045 A1 | 7/2022 | Amanatullah et al. |
| 2022/0241018 A1 | 8/2022 | Dorman |
| 2022/0249171 A1 | 8/2022 | Lang |
| 2022/0265355 A1 | 8/2022 | Ferrante et al. |
| 2022/0273450 A1 | 9/2022 | Steines et al. |
| 2022/0280249 A1 | 9/2022 | Calloway et al. |
| 2022/0287676 A1 | 9/2022 | Steines et al. |
| 2022/0291741 A1 | 9/2022 | Gibby et al. |
| 2022/0313386 A1 | 10/2022 | Healy et al. |
| 2022/0346970 A1 | 11/2022 | Nikou |
| 2022/0361955 A1 | 11/2022 | Signoretti et al. |
| 2023/0000556 A1 | 1/2023 | McKinnon et al. |
| 2023/0000570 A1 | 1/2023 | Marti et al. |
| 2023/0018541 A1 | 1/2023 | Tanzer et al. |
| 2023/0038678 A1 | 2/2023 | Lang |
| 2023/0056596 A1 | 2/2023 | Farley et al. |
| 2023/0074630 A1 | 3/2023 | Knopf |
| 2023/0085387 A1 | 3/2023 | Jones et al. |
| 2023/0113383 A1 | 4/2023 | Gonzalez et al. |
| 2023/0118746 A1 | 4/2023 | Hettich et al. |
| 2023/0131515 A1 | 4/2023 | Oezbek et al. |
| 2023/0149099 A1 | 5/2023 | Murphy |
| 2023/0165639 A1 | 6/2023 | Dulin et al. |
| 2023/0165640 A1 | 6/2023 | Dulin et al. |
| 2023/0233257 A1 | 7/2023 | Young et al. |
| 2023/0233258 A1 | 7/2023 | Young et al. |
| 2023/0233259 A1 | 7/2023 | Young et al. |
| 2023/0274517 A1 | 8/2023 | Navab et al. |
| 2023/0293237 A1 | 9/2023 | Samaha et al. |
| 2023/0293238 A1 | 9/2023 | Cardinale et al. |
| 2023/0293259 A1 | 9/2023 | Lomeli |
| 2023/0301723 A1 | 9/2023 | Johnson et al. |
| 2023/0355311 A1 | 11/2023 | Moctezuma De la Barrera |
| 2023/0404678 A1 | 12/2023 | Denissen et al. |

FOREIGN PATENT DOCUMENTS

| | | | |
|---|---|---|---|
| EP | 3861956 A1 | 8/2021 | |
| EP | 3996622 A2 | 5/2022 | |
| EP | 4103088 A1 | 12/2022 | |
| WO | WO-2019148154 A1 * | 8/2019 | ............ A61B 34/10 |
| WO | 2021163039 A1 | 8/2021 | |
| WO | 2022147591 A1 | 7/2022 | |
| WO | 2023281477 A1 | 1/2023 | |
| WO | 2023039032 A1 | 3/2023 | |
| WO | 2023086592 A2 | 5/2023 | |
| WO | 2023110124 A1 | 6/2023 | |

OTHER PUBLICATIONS

Boissonnat, "Shape Reconstruction from Planar Cross Sections," Computer Vision, Graphics, and Image Processing, vol. 44, Oct. 1988, pp. 1-29.

International Search Report and Written Opinion of International Application No. PCT/US2021/016235, dated Jun. 23, 2021, 15 pp.

Marker et al., "Contour-Based Surface Reconstruction using Implicit Curve Fitting, and Distance Field Filtering and Interpolation," The Eurographics Association, Jan. 2006, 9 pp.

Nguyen et al., "A New Segmentation Method for MRI Images of the Shoulder Joint," Fourth Canadian Conference on Computer and Robot Vision(CRV'07), May 28-30, 2007, 8 pp.

* cited by examiner

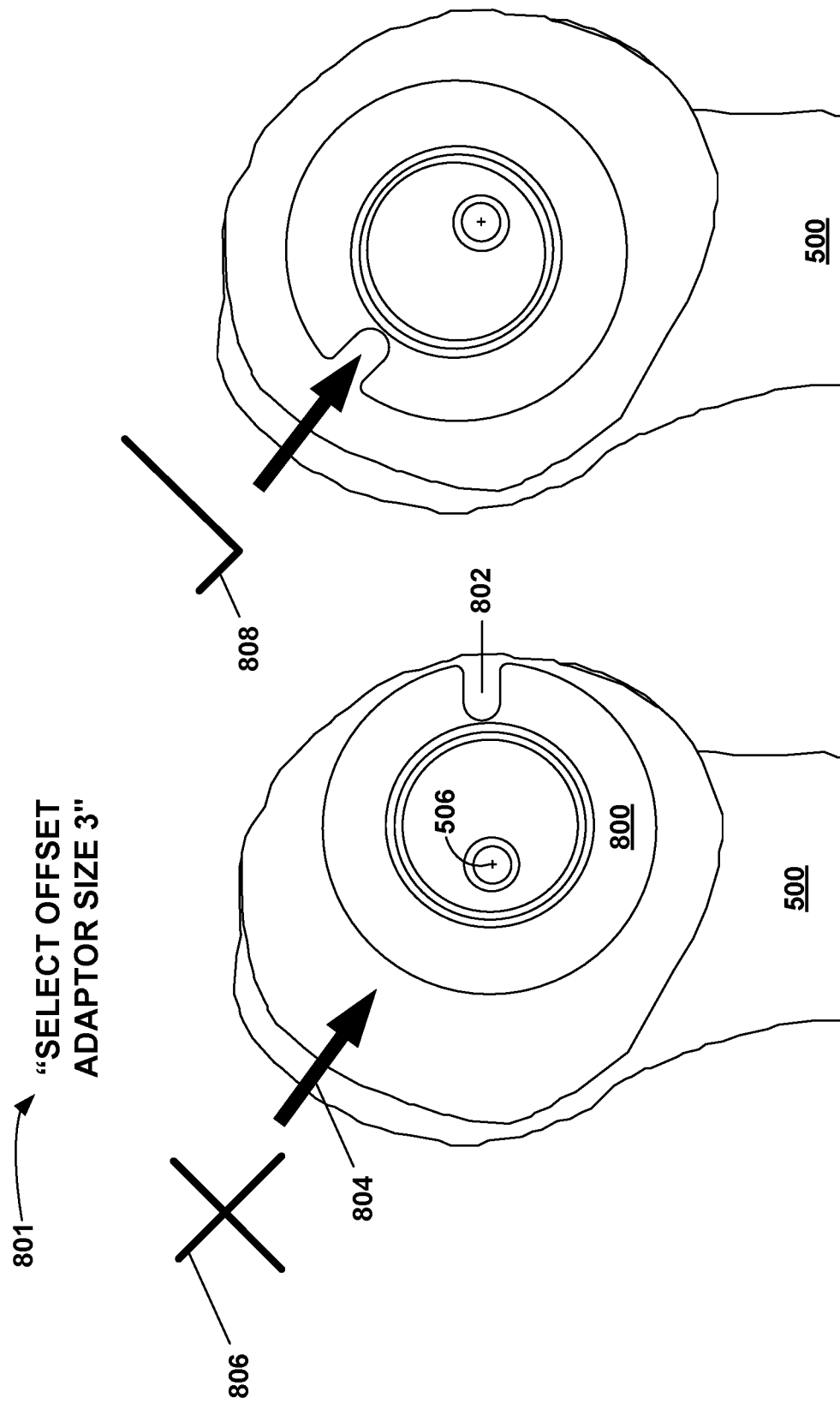

MIXED-REALITY HUMERAL-HEAD SIZING AND PLACEMENT

This application is a national stage application under 35 U.S.C. § 371 of PCT Application No. PCT/US2021/016235, filed Feb. 2, 2021, which claims the benefit of U.S. Provisional Application No. 63/017,428, filed Apr. 29, 2020. The entire contents of each of PCT Application No. PCT/US2021/016235, U.S. Provisional Application No. 63/017,428 are incorporated herein by reference in their entirety.

BACKGROUND

Surgical repair procedures involve the repair and/or replacement of a damaged or diseased anatomical object, such as with a prosthetic implant device. For example, an arthroplasty is the standard of care for the treatment of shoulder joint arthritis. A reversed shoulder arthroplasty (RSA) may allow even better range of motion, limits notching, and corrects bone deficiency.

SUMMARY

This disclosure describes example techniques for guiding a physician through a joint replacement surgery. A computing device may identify a resected bone surface; determine an implant size and alignment to match the resected bone surface; and output for display, via a visualization device, a graphical representation of the implant relative to the resected bone surface viewable via the visualization device.

In this manner, the example techniques provide a technical solution for accurately guiding a surgeon through a joint replacement surgery, such as an arthroplasty. For instance, the example techniques provide for practical applications of preoperative and intraoperative planning utilizing image processing for facilitating accurate implant sizing and alignment.

In one example, the disclosure describes a system for guiding a joint replacement surgery, including a visualization device comprising one or more sensors; and processing circuitry configured to: determine, based on data generated by the one or more sensors, one or more size parameters of a bone resection surface viewable via the visualization device; select, based on the one or more size parameters of the bone resection surface and from a plurality of implants, an implant; and output for display, via the visualization device, a graphical representation of the selected implant relative to the bone resection surface.

In one example, the disclosure describes a method for guiding a joint replacement surgery, including determining one or more size parameters of a bone resection surface viewable via a visualization device; selecting, based on the one or more size parameters of the bone resection surface and from a plurality of implants, an implant; and outputting for display, via the visualization device, a graphical representation of the selected implant relative to the bone resection surface.

In some examples, a computer-readable storage medium includes instructions to cause one or more processors to determine one or more size parameters of a bone resection surface viewable via a visualization device; select, based on the one or more size parameters of the bone resection surface and from a plurality of implants, an implant; and output for display a graphical representation of the selected implant relative to the bone resection surface.

The details of various examples of the disclosure are set forth in the accompanying drawings and the description below. Various features, objects, and advantages will be apparent from the description, drawings, and claims.

BRIEF DESCRIPTION OF THE DRAWINGS

FIGS. 7-9 are conceptual diagrams depicting one or more example overlaid MR graphical user interface (GUI) elements that may be generated and displayed on a visualization device, in accordance with one or more techniques of this disclosure.

DETAILED DESCRIPTION

Figure 1:
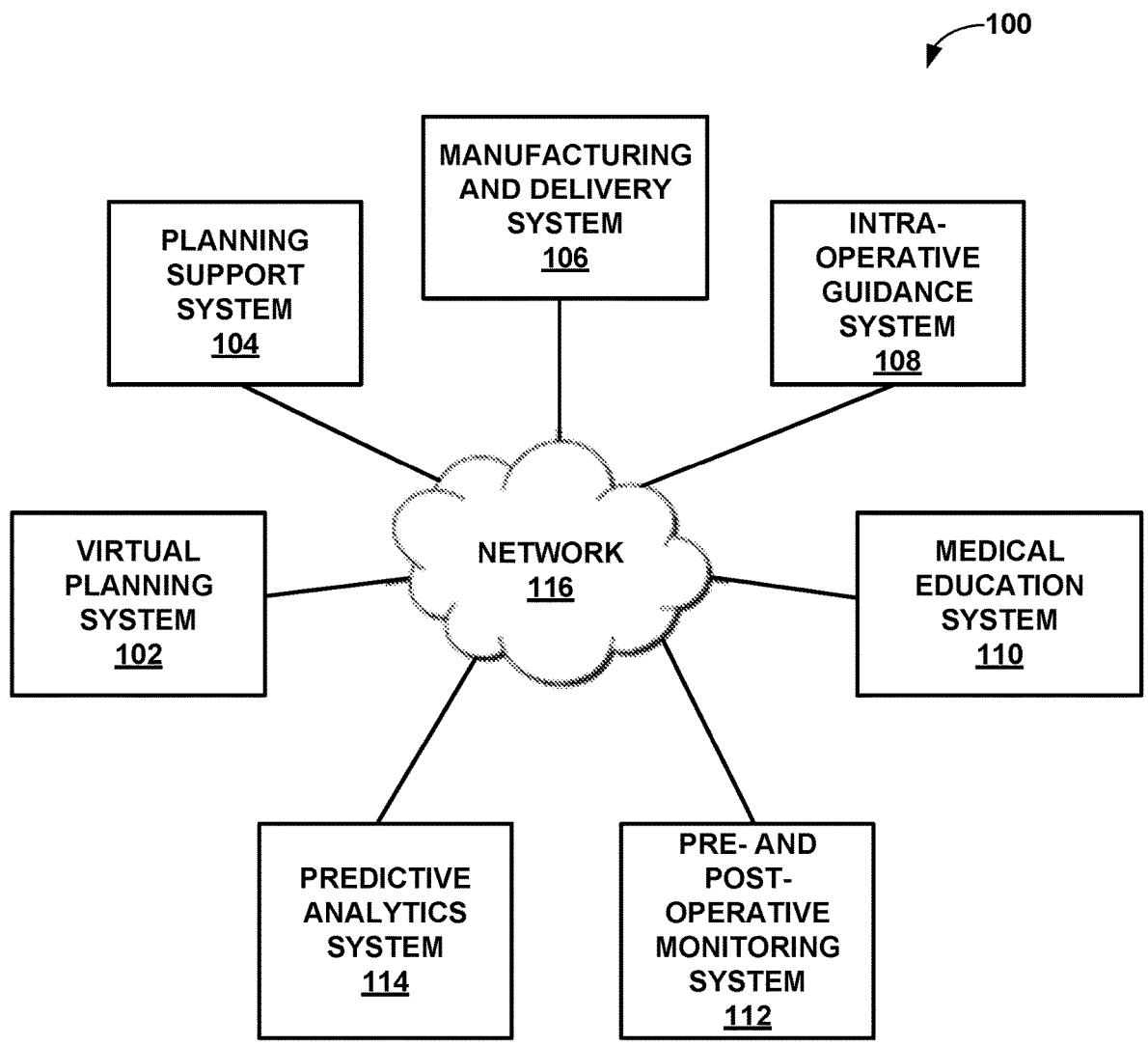
FIG. 1 is a block diagram of an orthopedic surgical system according to an example of this disclosure.

Orthopedic surgery can involve implanting one or more prosthetic devices (e.g., "implants") to repair or replace a patient's damaged or diseased joint. Prosthetic devices may be manufactured in a variety of different sizes. Selection of a "correct" size for a prosthetic device may be critical for patient outcomes. For example, a well-fit implant may improve a range-of-motion for the repaired joint. Further, a well-fit implant may improve the contact between the repaired joint and the surrounding tissue. In some examples, improved contact between the repaired joint and the surrounding tissue may help to shorten post-surgical recovery times.

Virtual surgical planning tools may use image data of the diseased or damaged joint to generate an accurate three-dimensional bone model and/or an implant model that can be viewed and manipulated preoperatively and/or intraoperatively by the surgeon. These tools can enhance surgical outcomes by allowing the surgeon to simulate the surgery, select or design an implant that more closely matches the contours of the patient's actual bone, and/or select or design surgical instruments and guide tools that are adapted specifically for repairing the bone of a particular patient.

Use of these planning tools may result in generation of a preoperative surgical plan, complete with an implant and surgical instruments that are selected or manufactured for the individual patient. Oftentimes, once in the actual operating environment, the surgeon may desire to verify the preoperative surgical plan intraoperatively relative to the patient's actual bone. This verification may result in a determination that an adjustment to the preoperative surgical plan is needed, such as a different implant, a different positioning or orientation of the implant, and/or a different surgical guide for carrying out the surgical plan. In addition, a surgeon may want to view details of the preoperative surgical plan relative to the patient's real bone during the actual procedure in order to more efficiently and accurately position and orient the implant components. For example, the surgeon may want to obtain intra-operative visualization that provides guidance for positioning and orientation of implant components, guidance for preparation of bone or tissue to receive the implant components, guidance for reviewing the details of a procedure or procedural step, and/or guidance for selection of tools or implants and tracking of surgical procedure workflow.

In accordance with one or more techniques of this disclosure, a computing device may generate information indicative of a respective size and fit for an implant to be coupled to a target site, such as a resected bone surface. The surgeon may utilize the generated information to select a particular implant from among a plurality of differently sized implants. The surgeon may also utilize the generated information intraoperatively for surgical guidance, such as to assist in precise alignment of the selected implant. In this way, the techniques of this disclosure may improve patient outcomes by improving the range-of-motion for the repaired joint, improve the contact between the repaired joint and the surrounding tissue, and shorten post-surgical recovery times.

For example, processing circuitry (e.g., processing circuitry of one or more computing devices) may be configured to determine at least one implant model for an implant to be connected to a first anatomical object (e.g., target bone). "Implant model" refers to a representation of size and shape of the prosthetic devices that is to be coupled to a target site. The implant model may be a graphical representation that can be displayed, such as intraoperatively on a mixed reality (MR) visualization device. The implant model may be represented by shape equations that define a particular size and shape, or points within particular size and shape having assigned coordinates, as a few examples.

There may be various ways in which the processing circuitry determines the implant model. As one example, the processing circuitry may output for display image data showing the target bone, and the processing circuitry may receive input from the surgeon for what the implant model should look like. The processing circuitry may determine the implant model based on the received input. As another example, the processing circuitry may be configured to generate a premorbid construction of the target bone. The processing circuitry may determine a difference between the premorbid construction and the actual target bone to determine the implant model.

The processing circuitry may determine information indicative of placement of the implant model relative to a representation of an anatomical object (e.g., target site). For example, a memory may store image data for one or more images of anatomical objects. As one example, memory may store image data of computerized tomography (CT) scans of the patient. Part of the image data includes a representation of the target site (e.g., images of the target site). The processing circuitry may determine information indicative of how the implant model fits relative to the representation of the target site based on the image data.

As one example, the surgeon may move (e.g., drag and place with a stylus) a displayed representation of the implant model relative to the representation of the target site. In response to the movement of the implant model, the processing circuitry may determine information needed to move the representation of the implant model (e.g., information such as coordinates of where the implant model is to be displayed). The processing circuitry may then output information indicative of the placement of the implant model relative to the representation of the target site (e.g., output graphical information used to render the implant model with the representation of the target site).

Figure 7A:
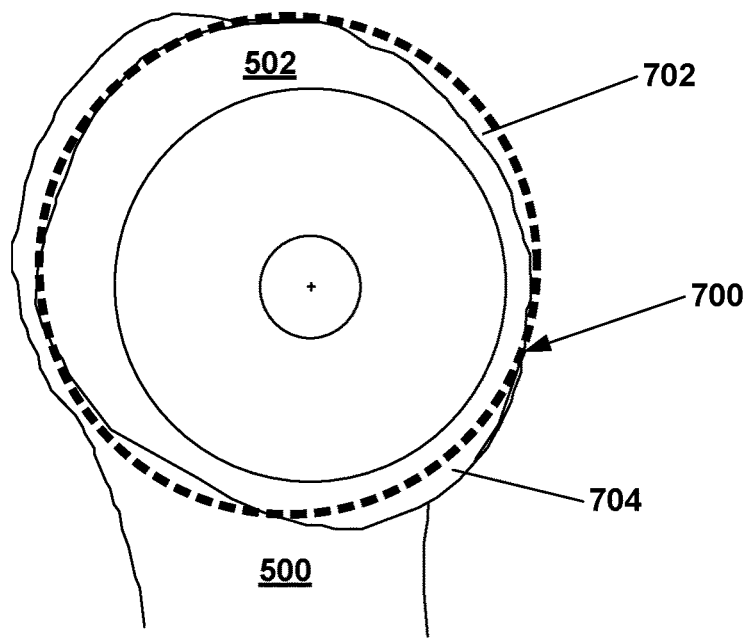

As another example, the processing circuitry may be configured to utilize the points or shape equations of the implant model and the points in the representation of the target site to determine how to place the implant model relative to the representation of the target site. The processing circuitry may utilize certain criteria in determining information indicative of the placement such as information that defines boundaries within the target site to where an implant may be coupled. For instance, the boundary may define certain configurations in which an implant may be coupled so as to substantially align with the implant site, where for other configurations of the implant model relative to the target site, there may be discrepancies in alignment of the implant. For example, the target site may include a substantially planar resected bone surface, configured to be coupled to a substantially planar surface of the implant. However, because the resected bone surface may include a different size and/or shape than the planar surface of the implant, the resected bone surface may exhibit undesired portions of "overhang" or "underhang" between the two surfaces. For example, as shown in FIG. 7A below, an "overhang" may indicate a region wherein an edge of the prosthetic device extends past a corresponding edge of the resected bone surface. Conversely, an "underhang" may indicate a region where an edge of the prosthetic device falls short of the corresponding edge of the resected bone surface, or equivalently, where the edge of the resected bone surface extends past the corresponding edge of the prosthetic device. In some examples, these types of unmatched portions may present a possibility of cosmetic defect, injury, or susceptibility to injury, for example, due to contact between the misaligned edges and the surrounding tissue. The processing circuitry may output the determined information (e.g., graphical information used to render the implant model relative to the representation of the target site).

There may be various ways in which the surgeon may preoperatively view image content such as the implant model, placement of the implant model at the target site, and additional surgical guidance information. Also, in some examples in accordance with this disclosure, the surgeon may be able to view the implant model, placement of the implant model at the target site, and additional surgical guidance information during the operation.

For example, the surgeon may use a mixed reality (MR) visualization system to assist with creation, implementation, verification, and/or modification of a surgical plan before and during a surgical procedure. Because MR, or in some instances virtual reality (VR), may be used to interact with the surgical plan, this disclosure may also refer to the surgical plan as a "virtual" surgical plan. Visualization tools other than or in addition to mixed reality visualization systems may be used in accordance with techniques of this disclosure.

A surgical plan, e.g., as generated by the BLUEPRINT™ system or another surgical planning platform, may include information defining a variety of features of a surgical procedure, such as features of particular surgical procedure steps to be performed on a patient by a surgeon according to the surgical plan including, for example, bone or tissue preparation steps and/or steps for selection, modification and/or placement of implant components. Such information may include, in various examples, dimensions, shapes, angles, surface contours, and/or orientations of implant components to be selected or modified by surgeons, dimensions, shapes, angles, surface contours and/or orientations to be defined in bone or tissue by the surgeon in bone or tissue preparation steps, and/or positions, axes, planes, angle and/or entry points defining placement of implant components by the surgeon relative to patient bone or tissue. Information such as dimensions, shapes, angles, surface contours, and/or orientations of anatomical features of the patient may be derived from imaging (e.g., x-ray, CT, MM, ultrasound or other images), direct observation, or other techniques.

In this disclosure, the term "mixed reality" (MR) refers to the presentation of virtual objects such that a user sees images that include both real, physical objects and virtual objects. Virtual objects may include text, 2-dimensional surfaces, 3-dimensional models, or other user-perceptible elements that are not actually present in the physical, real-world environment in which they are presented as coexisting. In addition, virtual objects described in various examples of this disclosure may include graphics, images, animations or videos, e.g., presented as 3D virtual objects or 2D virtual objects. Virtual objects may also be referred to as virtual elements. Such elements may or may not be analogs of real-world objects. In some examples, in mixed reality, a camera may capture images of the real world and modify the images to present virtual objects in the context of the real world. In such examples, the modified images may be displayed on a screen, which may be head-mounted, hand-held, or otherwise viewable by a user.

This type of mixed reality is increasingly common on smartphones, such as where a user can point a smartphone's camera at a sign written in a foreign language and see in the smartphone's screen a translation in the user's own language of the sign superimposed on the sign along with the rest of the scene captured by the camera. In some examples, in mixed reality, see-through (e.g., transparent) holographic lenses, which may be referred to as waveguides, may permit the user to view real-world objects, i.e., actual objects in a real-world environment, such as real anatomy, through the holographic lenses and also concurrently view virtual objects.

The Microsoft HOLOLENS™ headset, available from Microsoft Corporation of Redmond, Washington, is an example of a MR device that includes see-through holographic lenses, sometimes referred to as waveguides, that permit a user to view real-world objects through the lens and concurrently view projected 3D holographic objects. The Microsoft HOLOLENS™ headset, or similar waveguide-based visualization devices, are examples of an MR visualization device that may be used in accordance with some examples of this disclosure. Some holographic lenses may present holographic objects with some degree of transparency through see-through holographic lenses so that the user views real-world objects and virtual, holographic objects. In some examples, some holographic lenses may, at times, completely prevent the user from viewing real-world objects and instead may allow the user to view entirely virtual environments. The term mixed reality may also encompass scenarios where one or more users are able to perceive one or more virtual objects generated by holographic projection. In other words, "mixed reality" may encompass the case where a holographic projector generates holograms of elements that appear to a user to be present in the user's actual physical environment.

In some examples, in mixed reality, the positions of some or all presented virtual objects are related to positions of physical objects in the real world. For example, a virtual object may be tethered to a table in the real world, such that the user can see the virtual object when the user looks in the direction of the table but does not see the virtual object when the table is not in the user's field of view. In some examples, in mixed reality, the positions of some or all presented virtual objects are unrelated to positions of physical objects in the real world. For instance, a virtual item may always appear in the top right of the user's field of vision, regardless of where the user is looking.

Augmented reality (AR) is similar to MR in the presentation of both real-world and virtual elements, but AR generally refers to presentations that are mostly real, with a few virtual additions to "augment" the real-world presentation. For purposes of this disclosure, MR is considered to include AR. For example, in AR, parts of the user's physical environment that are in shadow can be selectively brightened without brightening other areas of the user's physical environment. This example is also an instance of MR in that the selectively-brightened areas may be considered virtual objects superimposed on the parts of the user's physical environment that are in shadow.

Furthermore, in this disclosure, the term "virtual reality" (VR) refers to an immersive artificial environment that a user experiences through sensory stimuli (such as sights and sounds) provided by a computer. Thus, in virtual reality, the user may not see any physical objects as they exist in the real world. Video games set in imaginary worlds are a common example of VR. The term "VR" also encompasses scenarios where the user is presented with a fully artificial environment in which some virtual object's locations are based on the locations of corresponding physical objects as they relate to the user. Walk-through VR attractions are examples of this type of VR.

The term "extended reality" (XR) is a term that encompasses a spectrum of user experiences that includes virtual reality, mixed reality, augmented reality, and other user experiences that involve the presentation of at least some perceptible elements as existing in the user's environment that are not present in the user's real-world environment. Thus, the term "extended reality" may be considered a genus for MR and VR. XR visualizations may be presented in any of the techniques for presenting mixed reality discussed elsewhere in this disclosure or presented using techniques for presenting VR, such as VR goggles.

FIG. 1 is a block diagram of an orthopedic surgical system 100 according to an example of this disclosure. Orthopedic surgical system 100 includes a set of subsystems. In the example of FIG. 1, the subsystems include a virtual planning system 102, a planning support system 104, a manufacturing and delivery system 106, an intraoperative guidance system 108, a medical education system 110, a monitoring system 112, a predictive analytics system 114, and a communications network 116. In other examples, orthopedic surgical system 100 may include more, fewer, or different subsystems. For example, orthopedic surgical system 100 may omit medical education system 110, monitor system 112, predictive analytics system 114, and/or other subsystems. In some examples, orthopedic surgical system 100 may be used for surgical tracking, in which case orthopedic surgical system 100 may be referred to as a surgical tracking system. In other cases, orthopedic surgical system 100 may be generally referred to as a medical device system.

Users of orthopedic surgical system 100 may use virtual planning system 102 to plan orthopedic surgeries. Users of orthopedic surgical system 100 may use planning support system 104 to review surgical plans generated using orthopedic surgical system 100. Manufacturing and delivery system 106 may assist with the manufacture and delivery of items needed to perform orthopedic surgeries. Intraoperative guidance system 108 provides guidance to assist users of orthopedic surgical system 100 in performing orthopedic surgeries. Medical education system 110 may assist with the education of users, such as healthcare professionals, patients, and other types of individuals. Pre- and postoperative monitoring system 112 may assist with monitoring patients before and after the patients undergo surgery. Predictive analytics system 114 may assist healthcare professionals with various types of predictions. For example, predictive analytics system 114 may apply artificial intelligence techniques to determine a classification of a condition of an orthopedic joint, e.g., a diagnosis, determine which type of surgery to perform on a patient and/or which type of implant to be used in the procedure, determine types of items that may be needed during the surgery, and so on.

The subsystems of orthopedic surgical system 100 (i.e., virtual planning system 102, planning support system 104, manufacturing and delivery system 106, intraoperative guidance system 108, medical education system 110, pre- and postoperative monitoring system 112, and predictive analytics system 114) may include various systems. The systems in the subsystems of orthopedic surgical system 100 may include various types of computing systems, computing devices, including server computers, personal computers, tablet computers, smartphones, display devices, Internet of Things (IoT) devices, visualization devices (e.g., mixed reality (MR) visualization devices, virtual reality (VR) visualization devices, holographic projectors, or other devices for presenting extended reality (XR) visualizations), surgical tools, and so on. A holographic projector, in some examples, may project a hologram for general viewing by multiple users or a single user without a headset, rather than viewing only by a user wearing a headset. For example, virtual planning system 102 may include a MR visualization device and one or more server devices, planning support system 104 may include one or more personal computers and one or more server devices, and so on. A computing system is a set of one or more computing systems configured to operate as a system. In some examples, one or more devices may be shared between the two or more of the subsystems of orthopedic surgical system 100. For instance, in the previous examples, virtual planning system 102 and planning support system 104 may include the same server devices.

In the example of FIG. 1, the devices included in the subsystems of orthopedic surgical system 100 may communicate using communication network 116. Communication network 116 may include various types of communication networks including one or more wide-area networks, such as the Internet, local area networks, and so on. In some examples, communication network 116 may include wired and/or wireless communication links.

Figure 2:
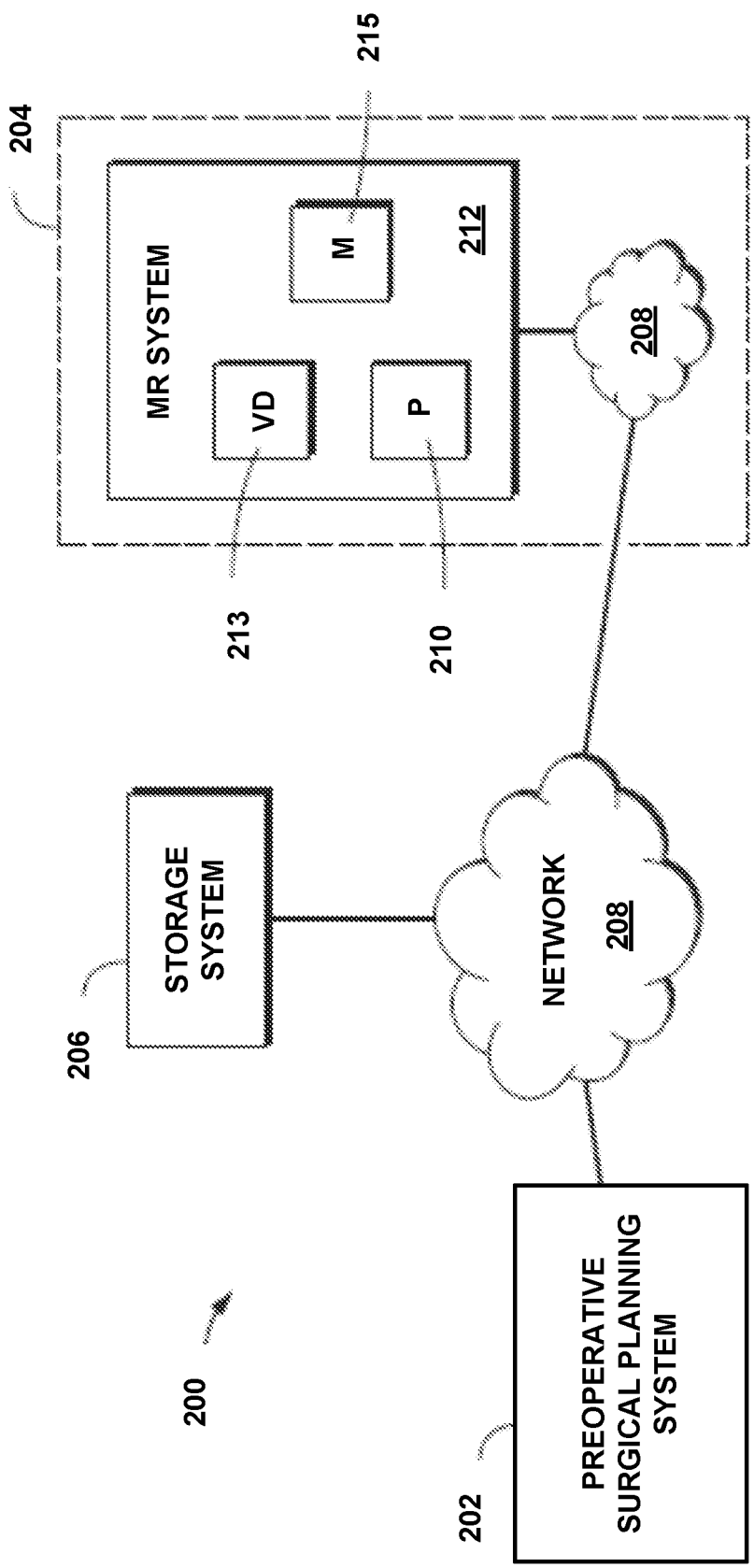
FIG. 2 is a block diagram of an orthopedic surgical system that includes a mixed reality (MR) system, according to an example of this disclosure.

Many variations of orthopedic surgical system 100 are possible in accordance with techniques of this disclosure. Such variations may include more or fewer subsystems than the version of orthopedic surgical system 100 shown in FIG. 1. For example, FIG. 2 is a block diagram of an orthopedic surgical system 200 that includes one or more mixed reality (MR) systems, according to an example of this disclosure. Orthopedic surgical system 200 may be used for creating, verifying, updating, modifying and/or implementing a surgical plan. In some examples, the surgical plan can be created preoperatively, such as by using a virtual surgical planning system (e.g., the BLUEPRINT™ system), and then verified, modified, updated, and viewed intraoperatively, e.g., using MR visualization of the surgical plan. In other examples, orthopedic surgical system 200 can be used to create the surgical plan immediately prior to surgery or intraoperatively, as needed. In some examples, orthopedic surgical system 200 may be used for surgical tracking, in which case orthopedic surgical system 200 may be referred to as a surgical tracking system. In other cases, orthopedic surgical system 200 may be generally referred to as a medical device system.

In the example of FIG. 2, orthopedic surgical system 200 includes a preoperative surgical planning system 202, a healthcare facility 204 (e.g., a surgical center or hospital), a storage system 206 and a network 208 that allows a user at healthcare facility 204 to access stored patient information, such as medical history, image data corresponding to the damaged joint or bone and various parameters corresponding to a surgical plan that has been created preoperatively (as examples). Preoperative surgical planning system 202 may be equivalent to virtual planning system 102 of FIG. 1 and, in some examples, may generally correspond to a virtual planning system similar or identical to the BLUEPRINT™ system.

In the example of FIG. 2, healthcare facility 204 includes a mixed reality (MR) system 212. In some examples of this disclosure, MR system 212 includes one or more processing device(s) (P) 210 to provide functionalities that will be described in further detail below. Processing device(s) 210 may also be referred to as processor(s) or processing circuitry. In addition, one or more users of MR system 212 (e.g., a surgeon, nurse, or other care provider) can use processing device(s) (P) 210 to generate a request for a particular surgical plan or other patient information that is transmitted to storage system 206 via network 208. In response, storage system 206 returns the requested patient information to MR system 212. In some examples, the users can use other processing device(s) to request and receive information, such as one or more processing devices that are part of MR system 212, but not part of any visualization device, or one or more processing devices that are part of a visualization device (e.g., visualization device 213) of MR system 212, or a combination of one or more processing devices that are part of MR system 212, but not part of any visualization device, and one or more processing devices that are part of a visualization device (e.g., visualization device 213) that is part of MR system 212.

In some examples, multiple users can simultaneously use MR system 212. For example, MR system 212 can be used in a spectator mode in which multiple users each use their own visualization devices so that the users can view the same information at the same time and from the same point of view. In some examples, MR system 212 may be used in a mode in which multiple users each use their own visualization devices so that the users can view the same information from different points of view.

In some examples, processing device(s) 210 can provide a user interface to display data and receive input from users at healthcare facility 204. Processing device(s) 210 may be configured to control visualization device 213 to present a user interface. Furthermore, processing device(s) 210 may be configured to control visualization device 213 to present virtual images, such as 3D virtual models, 2D images, and so on. Processing device(s) 210 can include a variety of different processing or computing devices, such as servers, desktop computers, laptop computers, tablets, mobile phones and other electronic computing devices, or processors within such devices. In some examples, one or more of processing device(s) 210 can be located remote from healthcare facility 204. In some examples, processing device(s)

210 reside within visualization device 213. In some examples, at least one of processing device(s) 210 is external to visualization device 213. In some examples, one or more processing device(s) 210 reside within visualization device 213 and one or more of processing device(s) 210 are external to visualization device 213.

In the example of FIG. 2, MR system 212 also includes one or more memory or storage device(s) (M) 215 for storing data and instructions of software that can be executed by processing device(s) 210. The instructions of software can correspond to the functionality of MR system 212 described herein. In some examples, the functionalities of a virtual surgical planning application, such as the BLUE-PRINT™ system, can also be stored and executed by processing device(s) 210 in conjunction with memory storage device(s) (M) 215. For instance, memory or storage system 215 may be configured to store data corresponding to at least a portion of a virtual surgical plan. In some examples, storage system 206 may be configured to store data corresponding to at least a portion of a virtual surgical plan. In some examples, memory or storage device(s) (M) 215 reside within visualization device 213. In some examples, memory or storage device(s) (M) 215 are external to visualization device 213. In some examples, memory or storage device(s) (M) 215 include a combination of one or more memory or storage devices within visualization device 213 and one or more memory or storage devices external to the visualization device.

Network 208 may be equivalent to network 116. Network 208 can include one or more wide area networks, local area networks, and/or global networks (e.g., the Internet) that connect preoperative surgical planning system 202 and MR system 212 to storage system 206. Storage system 206 can include one or more databases that can contain patient information, medical information, patient image data, and parameters that define the surgical plans.

For example, medical images of the patient's target bone typically are generated preoperatively in preparation for an orthopedic surgical procedure. The medical images can include images of the relevant bone(s) taken along the sagittal plane and the coronal plane of the patient's body. The medical images can include X-ray images, magnetic resonance imaging (MM) images, computerized tomography (CT) images, ultrasound images, and/or any other type of 2D or 3D image that provides information about the relevant surgical area. Storage system 206 also can include data identifying the implant components selected for a particular patient (e.g., type, size, etc.), surgical guides selected for a particular patient, and details of the surgical procedure, such as entry points, cutting planes, drilling axes, reaming depths, etc. Storage system 206 can be a cloud-based storage system (as shown) or can be located at healthcare facility 204 or at the location of preoperative surgical planning system 202 or can be part of MR system 212 or visualization device (VD) 213, as examples.

MR system 212 can be used by a surgeon before (e.g., preoperatively) or during the surgical procedure (e.g., intraoperatively) to create, review, verify, update, modify and/or implement a surgical plan. In some examples, MR system 212 may also be used after the surgical procedure (e.g., postoperatively) to review the results of the surgical procedure, assess whether revisions are required, or perform other postoperative tasks. To that end, MR system 212 may include a visualization device 213 that may be worn by the surgeon and (as will be explained in further detail below) is operable to display a variety of types of information, including a 3D virtual image of the patient's diseased, damaged, or postsurgical joint and details of the surgical plan, such as a 3D virtual image of the prosthetic implant components selected for the surgical plan, 3D virtual images of entry points for positioning the prosthetic components, alignment axes and cutting planes for aligning cutting or reaming tools to shape the bone surfaces, or drilling tools to define one or more holes in the bone surfaces, in the surgical procedure to properly orient and position the prosthetic components, surgical guides and instruments and their placement on the damaged joint, and any other information that may be useful to the surgeon to implement the surgical plan. MR system 212 can generate images of this information that are perceptible to the user of the visualization device 213 before and/or during the surgical procedure.

In some examples, MR system 212 includes multiple visualization devices (e.g., multiple instances of visualization device 213) so that multiple users can simultaneously see the same images and share the same 3D scene. In some such examples, one of the visualization devices can be designated as the master device and the other visualization devices can be designated as observers or spectators. Any observer device can be re-designated as the master device at any time, as may be desired by the users of MR system 212.

In this way, FIG. 2 illustrates a surgical planning system 200 that may include a preoperative surgical planning system 202 and a mixed reality system 212 to guide or otherwise assist a surgeon to repair an anatomy of interest of a particular patient. For example, a surgical procedure may include an orthopedic joint repair surgical procedure, such as one of a standard total shoulder arthroplasty or a reverse shoulder arthroplasty. In these examples, the surgical procedure may include preparation of glenoid bone or preparation of humeral bone. In some examples, the orthopedic joint repair surgical procedure is one of a stemless standard total shoulder arthroplasty, a stemmed standard total shoulder arthroplasty, a stemless reverse shoulder arthroplasty, a stemmed reverse shoulder arthroplasty, an augmented glenoid standard total shoulder arthroplasty, and an augmented glenoid reverse shoulder arthroplasty.

The virtual surgical plan may include a 3D virtual model corresponding to the anatomy of interest of the particular patient and/or a 3D model of a prosthetic component matched to the particular patient to repair the anatomy of interest or selected to repair the anatomy of interest. Furthermore, in the example of FIG. 2, the surgical planning system includes a storage system 206 to store data corresponding to the virtual surgical plan. The surgical planning system of FIG. 2 also includes MR system 212, which may comprise visualization device 213. In some examples, visualization device 213 is wearable by a user. In some examples, visualization device 213 is held by a user, or rests on a surface in a place accessible to the user. MR system 212 may be configured to present a user interface via visualization device 213. The user interface is visually perceptible to the user using visualization device 213. For instance, in one example, a screen of visualization device 213 may display real-world images and the user interface on a screen. In some examples, visualization device 213 may project virtual, holographic images onto see-through holographic lenses and also permit a user to see real-world objects of a real-world environment through the lenses. In other words, visualization device 213 may comprise one or more see-through holographic lenses and one or more display devices that present imagery to the user via the holographic lenses to present the user interface to the user.

In some examples, visualization device 213 is configured such that the user can manipulate the user interface (which is visually perceptible to the user when the user is wearing or otherwise using visualization device 213) to request and view details of the virtual surgical plan for the particular patient, including a 3D virtual model of the anatomy of interest (e.g., a 3D virtual bone of the anatomy of interest) and a 3D model of the prosthetic component selected to repair an anatomy of interest. In some such examples, visualization device 213 is configured such that the user can manipulate the user interface so that the user can view the virtual surgical plan intraoperatively, including (at least in some examples) the 3D virtual model of the anatomy of interest (e.g., a 3D virtual bone of the anatomy of interest). In some examples, MR system 212 can be operated in an augmented surgery mode in which the user can manipulate the user interface intraoperatively so that the user can visually perceive details of the virtual surgical plan projected in a real environment, e.g., on a real anatomy of interest of the particular patient. In this disclosure, the terms real and real world may be used in a similar manner. For example, MR system 212 may present one or more virtual objects that provide guidance for preparation of a bone surface and placement of a prosthetic implant on the bone surface. Visualization device 213 may present one or more virtual objects in a manner in which the virtual objects appear to be overlaid on an actual, real anatomical object of the patient, within a real-world environment, e.g., by displaying the virtual object(s) with actual, real-world patient anatomy viewed by the user through holographic lenses. For example, the virtual objects may be 3D virtual objects that appear to reside within the real-world environment with the actual, real anatomical object.

As described above, in some examples, the techniques described in this disclosure further provide for ways in which to determine a size and/or alignment for an implanted prosthetic device. For example, in orthopedics, a prosthetic implant is commonly used for joint reconstruction. Surgeons may select a particular implant size according to the available area and shape of the target site, such as a resected bone surface. However, the desired implant may be either too large or too small for the target site and its implantation (e.g., position and/or alignment with the target site) may lead to additional complications at the donor site such as bone fractures, cosmetic deformities, injuries to surrounding tissue, and the like.

As an example, in a shoulder arthroplasty, a prosthetic humeral head implant is coupled to a resected surface of the humerus (e.g., the humerus is the target site). If the implant coupled to the resected humeral surface is too small (e.g., a portion of the prosthetic humeral head implant underhangs the resected bone surface), there may be possibility that the implantation results in fracture of the tuberosities, rotator cuff injury and/or excessive bone removal that may alter the quality of the fixation of the component (e.g., stem or nucleus inserted into the humerus).

In accordance with one or more techniques described in this disclosure, mixed reality system 212 (MR system 212) may determine, based on image data for one or more images of anatomical objects, at least one virtual implant model for an implant to be connected to the anatomical object depicted in the image data. MR system 212 may receive the images via one or more image sensors, such as one or more cameras included in a visualization device worn by a surgeon. The images of the anatomical objects may include representations (e.g., as image data) of anatomical objects, such as a resected bone surface.

MR system 212 may analyze the image data to determine one or more size parameters of the resected bone surface depicted in the image data. Based on the determined size parameters, MR system 212 may determine at least one virtual implant model for an implant to be connected to the anatomical object depicted in the image data. For example, visualization device 213 may be configured to display a representation of a plurality of differently sized or differently shaped virtual implant models, each virtual implant model displayed relative to the resected bone surface viewable through the device 213. The surgeon, viewing the representation of each of the plurality of implant models, may determine the size and shape of the implant that is to be connected to the resected bone surface. The surgeon may interact with the displayed representation to resize, position, and align an implant model based on the size and shape of the target site (e.g., the resected bone surface and/or an implant stem implanted within the resected bone surface).

In some examples, storage system 206 may store a plurality of pre-generated implant models of various size and shapes. Visualization device 213 may display the pre-generated implant models, and the surgeon may select one of the pre-generated implant models. Processing device(s) 210 may output information of the selected pre-generated implant model to preoperative surgical planning system 202 and/or MR system 212.

In some examples, preoperative surgical planning system 202 and/or MR system 212 may be configured to determine the bone implant model for the implant, and possibly with little to no intervention from the surgeon. For example, preoperative surgical planning system 202 may be configured to determine a size and/or shape of a first anatomical object, such as the resected bone surface. There may be various ways in which preoperative surgical planning system 202 may determine the shape of the first anatomical object, such as by segmenting out the first anatomical object from the other anatomical objects. Example ways in which to segment out the first anatomical object are described in U.S. Provisional Application Ser. Nos. 62/826,119, 62/826,133, 62/826,146, 62/826,168, and 62/826,190 all filed on Mar. 29, 2019 and incorporated by reference in their entirety. There may be other example ways in which to segment out the first anatomical object, such as in U.S. Pat. No. 8,971,606, and incorporated by reference in its entirety.

As one example, for segmenting, preoperative surgical planning system 202 may utilize differences in voxel intensities in image data to identify separation between bony regions and tissue regions to identify the first anatomical object. As another example, for segmenting, preoperative surgical planning system 202 may utilize closed-surface fitting (CSF) techniques in which preoperative surgical planning system 202 uses a shape model (e.g., predetermined shape like a sphere or a shape based on statistical shape modeling) and expands or constricts the shape model to fit a contour used to identify separation locations between bony regions and tissue or between tissue.

Preoperative surgical planning system 202 may determine a premorbid shape of the target bone (e.g., prior to disease or damage in examples where the target bone is for diseased or damaged bone) of the first anatomical object. Example ways in which to determine the premorbid shape of the first anatomical object are described in U.S. Provisional Application Nos. 62/826,172, 62/826,362, and 62/826,410 all filed on Mar. 29, 2019, and incorporated by reference in their entirety.

As one example, for determining premorbid shape, preoperative surgical planning system 202 may align a representation of the first anatomical object to coordinates of a statistical shape model (SSM) of the first anatomical object.

Preoperative surgical planning system 202 may deform the SSM to determine an SSM that registers to the representation of the aligned first anatomical object. The version of the SSM that registers to the representation of the first anatomical object may be the premorbid shape of the target bone.

Preoperative surgical planning system 202 may compare the shape of the implant model to the premorbid shape of the first anatomical object. For example, preoperative surgical planning system 202 may determine a difference between each of a plurality of implant models and the premorbid shape of the first anatomical object (e.g. how the first anatomical object appeared before disease or damage). Based on the comparison (e.g., difference), preoperative surgical planning system 202 may determine the implant model, for example, by selecting the implant model that would be most similar to the premorbid shape of the first anatomical object with respect to size and/or position. For instance, preoperative surgical planning system 202 may determine an implant model that has the approximately the same size and shape as the premorbid shape of the first anatomical object.

In one or more examples, preoperative surgical planning system 202 may be configured to determine information indicative of placement of the implant model relative to a virtual representation of the anatomical object (e.g., target site) based on the image data. For example, the image data includes representations of various anatomical objects within the patient, such as the humeral head and the humerus, the iliac crest, and the like. Using BLUEPRINT™ or using one or more the segmentation techniques described in U.S. Provisional Application Ser. Nos. 62/826,119, 62/826,133, 62/826,146, 62/826,168, and 62/826,190 all filed on Mar. 29, 2019 or U.S. Pat. No. 8,971,606, visualization device 213 may display a 3D virtual representation of the anatomical object, such as the target site. Although described with respect to a 3D representation, in some examples, visualization device 213 may display 2D scans of target site.

Using visualization device 213, the surgeon may "drag and drop" one or more virtual implant models (e.g., as drawn by the surgeon or as determined by preoperative surgical planning system 202) onto the virtual representation of the target site. In some examples, the surgeon may translate or rotate the implant model along the x, y, and/or z axis before or after dragging and dropping the implant model onto the representation of the target site.

In some examples, preoperative surgical planning system 202 may be configured to perform the calculations of rotating the implant model and calculating the coordinates of the implant model for aligning the implant model to the coordinate space of the representation of the anatomical object. For example, the implant model and the representation of the anatomical object may be in different coordinate systems, and to move the implant model to the representation of the anatomical object (e.g., target site), preoperative surgical planning system 202 may determine a transformation matrix that provides for rotation, translation, scaling, and shearing, as needed so that the implant model and the anatomical object are in the same coordinate system. One example way in which preoperative surgical planning system 202 may perform the rotation, translation, scaling, and shearing is using the OpenGL application programming interface (API); however, other ways in which to perform the rotation, translation, scaling, and shearing are possible. Also, once the implant model is in the coordinate system of the anatomical object or before the implant model is in the coordinate system of the anatomical object, the surgeon may rotate the implant model to view the implant model from different perspectives. Preoperative surgical planning system 202 performing the above example operations of aligning the coordinate system, rotating, and moving the implant model into the representation of the anatomical object are non-limiting examples of preoperative surgical planning system 202 determining information indicative of a placement of the implant model relative to a representation of the anatomical object based on the image data.

In the above example of preoperative surgical planning system 202 determining information indicative of a placement of the implant model relative to a representation of the anatomical object based on the image data, the surgeon performed "dragging and dropping" operations. In some examples, preoperative surgical planning system 202 may be configured to determine information indicative of placement of the implant model relative to a representation of the anatomical object based on the image data with little to no intervention from the surgeon.

For example, preoperative surgical planning system 202 may align the implant model to the coordinate system of the anatomical object. Preoperative surgical planning system 202 may then, based on the coordinates of the implant model (e.g., coordinates along the boundary of the implant model) and coordinates of the anatomical object, move the implant model to be aligned with the representation of the anatomical object. For instance, preoperative surgical planning system 202 may rotate and shift the implant model so that the implant model aligns with the representation of the anatomical object.

Accordingly, preoperative surgical planning system 202 may compare a size and shape of the implant model to the representation of the anatomical object and determine information indicative of the placement based on the comparison. In this manner, preoperative surgical planning system 202 may determine information indicative of placement of the implant model relative to a representation of the anatomical object based on the image data.

In the above examples, the implant model is described as being aligned with the coordinate system of the anatomical object. In some examples, the anatomical object may be aligned with the coordinate system of the implant model.

As another example, preoperative surgical planning system 202 may determine whether a particular placement of the implant would result in complicated surgery, preoperative surgical planning system 202 may determine that the particular placement is not a valid placement of the implant model. For example, if placement of the implant in a particular location would result in the implant not being accessible or require complicated surgery (e.g., excessive shifting of bone, higher changes of complication, etc.) to access the implant, then preoperative surgical planning system 202 may determine that the such placement of the implant model is not valid.

There may be other criteria that preoperative surgical planning system 202 may utilize when determining information indicative of placement of the implant model relative to the representation of the anatomical object. Preoperative surgical planning system 202 may be configured to use the above examples of the criteria and the additional examples of the criteria either alone or in any combination.

In some examples, preoperative surgical planning system 202 may be configured to output information indicative of whether the anatomical object is potentially suitable as a target site for the implant. For example, preoperative surgical planning system 202 may utilize the various criteria to determine whether the implant model can be placed in the anatomical object. If there are no valid placements for the implant model, preoperative surgical planning system 202 may output information indicating that the anatomical object may not be suitable as a target site. If there are valid placements for the implant model, preoperative surgical planning system 202 may output information indicating that the anatomical object is suitable as a target site.

In some examples, there may be multiple ways in which the implant model can fit relative to the anatomical object. Preoperative surgical planning system 202 may output the various valid options indicating where the implant model can be coupled to (e.g., aligned with) the anatomical object. In some examples, preoperative surgical planning system 202 may rank the valid options. In some examples, preoperative surgical planning system 202 may determine the best of the valid options (e.g., the location on the anatomical object from where the implant may be coupled with the greatest ease while minimizing overhang and/or underhang between coupled planar surfaces).

Preoperative surgical planning system 202 may be configured to output information indicative of the placement of the implant model relative to the representation of the anatomical object. As one example, preoperative surgical planning system 202 may generate information used by visualization device 213 to render the implant model relative to the representation of the anatomical object at the determined placement. As another example, preoperative surgical planning system 202 may generate coordinate values of the location of the implant model. There may be other examples of the information that preoperative surgical planning system 202 generates for outputting that is indicative of the placement of the implant model relative to the representation of the anatomical object (e.g., target site).

In some examples, preoperative surgical planning system 202 may be configured to generate pre-operative planning information based on placement of the implant model relative to the representation of the anatomical object. For example, the information indicative of the placement of the implant model may include information indicative of where the implant model is located relative to the representation of the anatomical object. The implant model may therefore provide a visual indication of where to couple the implant.

As one example, preoperative surgical planning system 202 may be configured to generate information indicative of a location relative to the anatomical object where the implant is to be coupled. Visualization device 213 may display the location preoperatively and/or intraoperatively.

As one example, preoperative surgical planning system 202 may be configured to generate information indicative of types of a tool to utilize to couple the implant to the target site. Visualization device 213 may display the types of tools preoperatively and/or intraoperatively. A tool may include, for example, an offset adaptor configured to couple the implant to an implant stem implanted within the target site. Visualization device 213 may indicate one or more offset values, such as a size, an offset distance, and an offset orientation of the offset adaptor in order to couple the implant to the desired location at the target site.

In the above examples, preoperative surgical planning system 202 is described as performing various operations. In some examples, the operations of preoperative surgical planning system 202 may be performed by processing device(s) 210. In some examples, some of the example operations described above may be performed by preoperative surgical planning system 202 and some of the example operations described above may be performed by processing device(s) 210.

In this disclosure, processing circuitry may be considered as performing example operations described in this disclosure. The processing circuitry may be processing circuitry of preoperative surgical planning system 202 or may be processing device(s) 210. In some examples, the processing circuitry refers to the processing circuitry distributed between MR system 212 and preoperative surgical planning system 202, as well as other processing circuitry in system 200.

Figure 3:
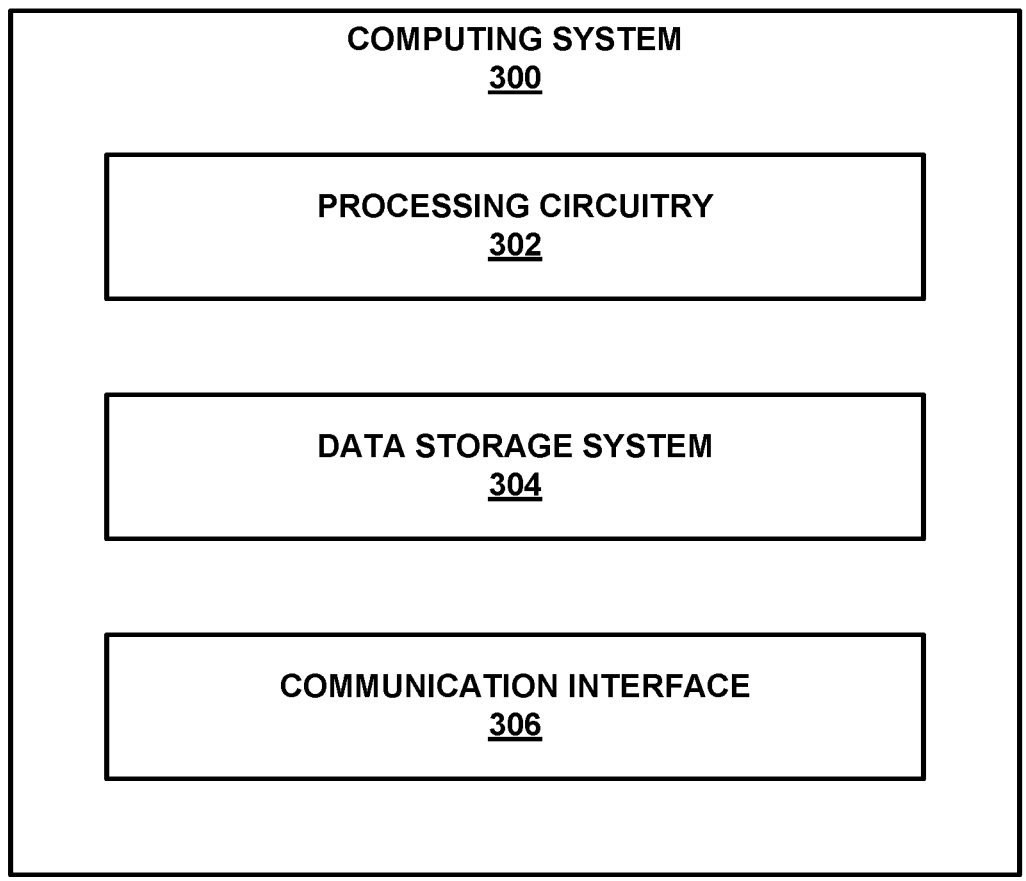
FIG. 3 is a block diagram illustrating an example of a computing system configured to perform one or more examples described in this disclosure.

FIG. 3 is a block diagram illustrating an example of computing system configured to perform one or more examples described in this disclosure. FIG. 3 illustrates an example of computing system 300, and preoperative surgical planning system 202 is an example of computing system 300. Examples of computing system 300 include various types of computing devices, such as server computers, personal computers, smartphones, laptop computers, and other types of computing devices.

Computing system 300 includes processing circuitry 320, data storage system 304, and communication interface 306. Computing system 300 may include additional components, such as a display, keyboard, etc., not shown in FIG. 3 for ease. Also, in some examples, computing system 300 may include fewer components. For example, data storage system 304 may be similar to storage system 206 of FIG. 2 and reside off of (e.g., be external to) computing system 300. However, data storage system 304 may be part of computing system 300 as illustrated. Even in examples where data storage system 304 is external to computing system 300, computing system 300 may still include local memory for storing instructions for execution by processing circuitry 302 and provide functionality for storing data used by or generated by processing circuitry 302. When data storage system 304 is the local memory, the amount of storage provided by data storage system 304 may less than storage system 206.

Examples of processing circuitry 302 include fixed-function processing circuits, programmable circuits, or combinations thereof, such as one or more digital signal processors (DSPs), general purpose microprocessors, application specific integrated circuits (ASICs), field programmable gate arrays (FPGAs), or other equivalent integrated or discrete logic circuitry. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute instructions specified by software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable.

Examples of data storage system 304 include RAM, ROM, EEPROM, CD-ROM or other optical disk storage, magnetic disk storage, or other magnetic storage devices, flash memory, or any other medium that can be used to store data. In some examples, data storage system 304 may also store program code in the form of instructions or data structures and that can be accessed by processing circuitry 302 for execution.

Communication interface 306 refers to circuitry that allows computing system 300 to connect, wirelessly or with wired connection, with other components. For instance, communication interface 306 provides the circuitry that allows computing device 300 to transmit to and receive from network 208 of FIG. 2.

Processing circuitry 302 is an example of processing circuitry configured to perform one or more example techniques described in this disclosure. In some examples, such as where MR system 212 is configured to perform various operations of preoperative surgical planning system 202, processing device(s) 210 may include processing circuitry 302. Also, in some examples, the processing circuitry that is configured to perform the example operations described in this disclosure may include the combination of processing circuitry 302, processing device(s) 210, and possibly one or more other processing circuitry. For example, FIG. 3 is described with respect to processing circuitry 302.

For example, data storage system 304 may store image data for one or more images of anatomical objects, and processing circuitry 302 may access the image data from data storage system 304. Utilizing one or more of the example techniques described above, processing circuitry 302 may be configured to determine an implant model for an implant to be connected to an anatomical object, determine information indicative of placement of the implant model relative to a representation of the anatomical object based on the image data, and output the information indicative of the placement of the implant model relative to the representation of the anatomical object.

Figure 4:
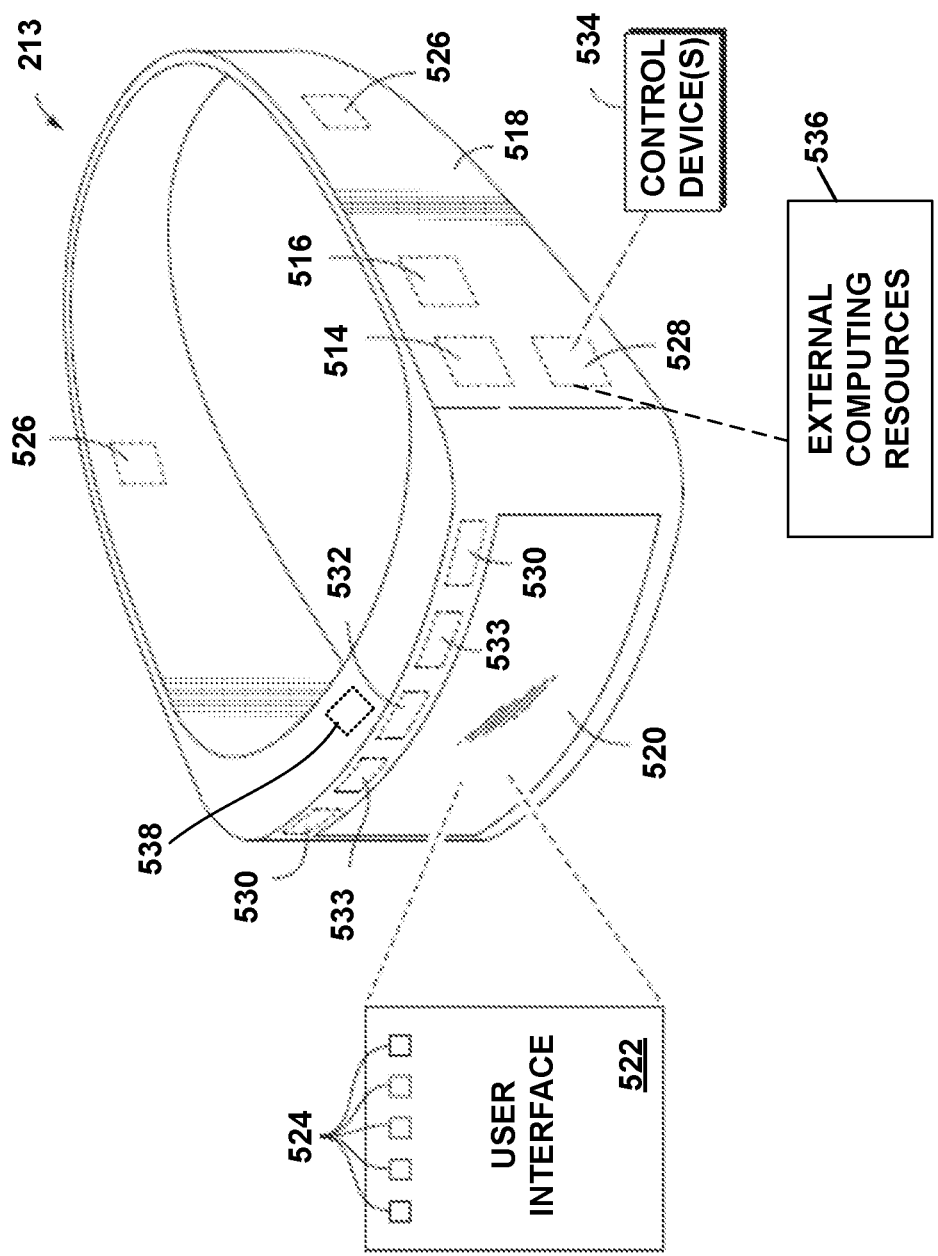
FIG. 4 is a schematic representation of a visualization device for use in an MR system, according to an example of this disclosure.

FIG. 4 is a schematic representation of visualization device 213 (FIG. 2) for use in an MR system, such as MR system 212 of FIG. 2, according to an example of this disclosure. As shown in the example of FIG. 4, visualization device 213 can include a variety of electronic components found in a computing system, including one or more processor(s) 514 (e.g., microprocessors or other types of processing units) and memory 516 that may be mounted on or within a frame 518. Furthermore, in the example of FIG. 4, visualization device 213 may include a transparent screen 520 that is positioned at eye level when visualization device 213 is worn by a user. In some examples, screen 520 can include one or more liquid crystal displays (LCDs) or other types of display screens on which images are perceptible to a surgeon who is wearing or otherwise using visualization device 213 via screen 520. Other display examples include organic light emitting diode (OLED) displays. In some examples, visualization device 213 can operate to project 3D images onto the user's retinas using techniques known in the art.

In some examples, screen 520 may include see-through holographic lenses, sometimes referred to as "waveguides," that permit a user to see real-world objects through (e.g., beyond) the lenses and also see holographic imagery projected into the lenses and onto the user's retinas by displays, such as liquid crystal on silicon (LCoS) display devices, which are sometimes referred to as light engines or projectors, operating as an example of a holographic projection system 538 within visualization device 213. In other words, visualization device 213 may include one or more see-through holographic lenses to present virtual images to a user. Hence, in some examples, visualization device 213 can operate to project 3D images onto the user's retinas via screen 520, e.g., formed by holographic lenses. In this manner, visualization device 213 may be configured to present a 3D virtual image to a user within a real-world view observed through screen 520, e.g., such that the virtual image appears to form part of the real-world environment. In some examples, visualization device 213 may be a Microsoft HOLOLENS™ headset, available from Microsoft Corporation, of Redmond, Washington, USA, or a similar device, such as, for example, a similar MR visualization device that includes waveguides. The HOLOLENS™ device can be used to present 3D virtual objects via holographic lenses, or waveguides, while permitting a user to view actual objects in a real-world scene, i.e., in a real-world environment, through the holographic lenses. Although the example of FIG. 4 illustrates visualization device 213 as a head-wearable device, visualization device 213 may have other forms and form factors. For instance, in some examples, visualization device 213 may be a handheld smartphone or tablet.

Visualization device 213 can also generate a user interface (UI) 522 that is visible to the user, e.g., as holographic imagery projected into see-through holographic lenses as described above. For example, UI 522 can include a variety of selectable widgets 524 that allow the user to interact with a mixed reality (MR) system, such as MR system 212 of FIG. 2.

Imagery presented by visualization device 213 may include, for example, one or more 3D virtual objects. Details of an example of UI 522 are described elsewhere in this disclosure. Visualization device 213 also can include a speaker or other sensory devices 526 that may be positioned adjacent the user's ears. Sensory devices 526 can convey audible information or other perceptible information (e.g., vibrations) to assist the user of visualization device 213.

Visualization device 213 can also include a transceiver 528 to connect visualization device 213 to a processing device 510 and/or to network 208 and/or to a computing cloud, such as via a wired communication protocol or a wireless protocol, e.g., Wi-Fi, Bluetooth, etc. Visualization device 213 also includes a variety of sensors to collect sensor data, such as one or more optical camera(s) 530 (or other optical sensors) and one or more depth camera(s) 532 (or other depth sensors), mounted to, on or within frame 518. In some examples, the optical sensor(s) 530 are operable to scan the geometry of the physical environment in which user of MR system 212 is located (e.g., an operating room) and collect two-dimensional (2D) optical image data (either monochrome or color). Depth sensor(s) 532 are operable to provide 3D image data, such as by employing time of flight, stereo or other known or future-developed techniques for determining depth and thereby generating image data in three dimensions. Other sensors can include motion sensors 533 (e.g., Inertial Measurement Unit (IMU) sensors, accelerometers, etc.) to assist with tracking movement.

MR system 212 processes the sensor data so that geometric, environmental, textural, etc. landmarks (e.g., corners, edges or other lines, walls, floors, objects) in the user's environment or "scene" can be defined and movements within the scene can be detected. As an example, the various types of sensor data can be combined or fused so that the user of visualization device 213 can perceive 3D images that can be positioned, or fixed and/or moved within the scene. When fixed in the scene, the user can walk around the 3D image, view the 3D image from different perspectives, and manipulate the 3D image within the scene using hand gestures, voice commands, gaze line (or direction) and/or other control inputs. As another example, the sensor data can be processed so that the user can position a 3D virtual object (e.g., a bone model) on an observed physical object in the scene (e.g., a surface, the patient's real bone, etc.) and/or orient the 3D virtual object with other virtual images displayed in the scene. As yet another example, the sensor data can be processed so that the user can position and fix a virtual representation of the surgical plan (or other widget, image or information) onto a surface, such as a wall of the operating room. Yet further, the sensor data can be used to recognize surgical instruments and the position and/or location of those instruments.

Visualization device 213 may include one or more processors 514 and memory 516, e.g., within frame 518 of the visualization device. In some examples, one or more external computing resources 536 process and store information, such as sensor data, instead of or in addition to in-frame processor(s) 514 and memory 516. In this way, data processing and storage may be performed by one or more processors 514 and memory 516 within visualization device 213 and/or some of the processing and storage requirements may be offloaded from visualization device 213. Hence, in some examples, one or more processors that control the operation of visualization device 213 may be within the visualization device, e.g., as processor(s) 514. Alternatively, in some examples, at least one of the processors that controls the operation of visualization device 213 may be external to the visualization device, e.g., as processor(s) 210. Likewise, operation of visualization device 213 may, in some examples, be controlled in part by a combination one or more processors 514 within the visualization device and one or more processors 210 external to the visualization device.

For instance, in some examples, when visualization device 213 is in the context of FIG. 2, processing of the sensor data can be performed by processing device(s) 210 in conjunction with memory or storage device(s) (M) 215. In some examples, processor(s) 514 and memory 516 mounted to frame 518 may provide sufficient computing resources to process the sensor data collected by cameras 530, 532 and motion sensors 533. In some examples, the sensor data can be processed using a Simultaneous Localization and Mapping (SLAM) algorithm, or other known or future-developed algorithm for processing and mapping 2D and 3D image data and tracking the position of visualization device 213 in the 3D scene. In some examples, image tracking may be performed using sensor processing and tracking functionality provided by the Microsoft HOLOLENS™ system, e.g., by one or more sensors and processors 514 within a visualization device 213 substantially conforming to the Microsoft HOLOLENS™ device or a similar mixed reality (MR) visualization device.

In some examples, MR system 212 can also include user-operated control device(s) 534 that allow the user to operate MR system 212, use MR system 212 in spectator mode (either as master or observer), interact with UI 522 and/or otherwise provide commands or requests to processing device(s) 210 or other systems connected to network 208. As examples, the control device(s) 534 can include a microphone, a touch pad, a control panel, a motion sensor or other types of control input devices with which the user can interact.

Figure 5:
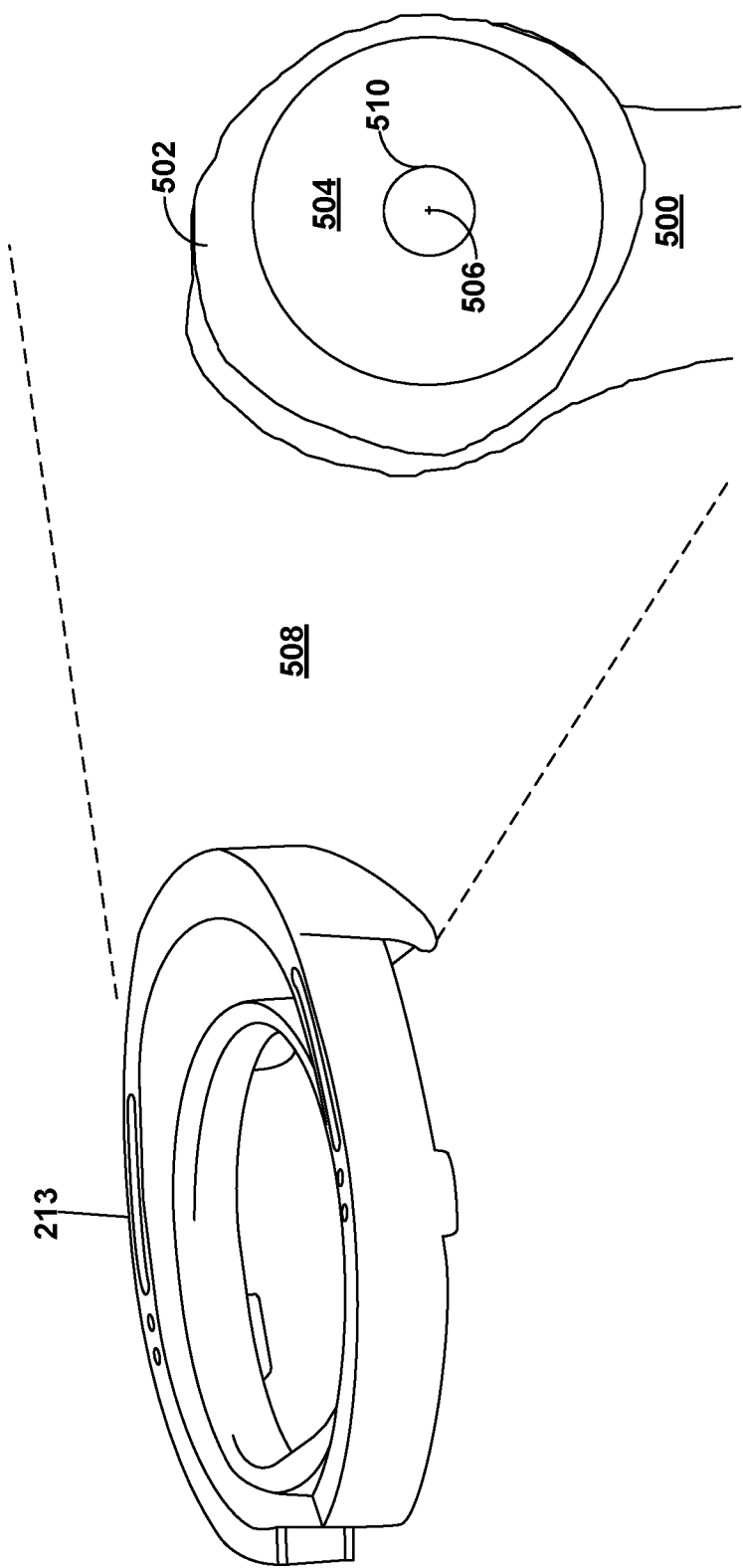
FIG. 5 is a conceptual diagram of an MR system including a visualization device configured to guide a joint replacement surgery, in accordance with one or more techniques of this disclosure.

FIG. 5 is a conceptual diagram of a mixed reality system including a visualization device 213 configured to guide a joint repair or replacement surgery in accordance with one or more techniques of this disclosure. In some examples, visualization device 213 (described further with respect to FIG. 4, above) may contain processing circuitry configured to at least identify a target implant site on an anatomical object for a prosthetic implant. For example, visualization device 213 may include one or more cameras 530, 532 (FIG. 4) configured to capture image data depicting a bone, such as humerus 500, in the field-of-view (FOV) 508 of the cameras 530, 532. Processor(s) 514 (FIG. 4) of visualization device 213 may be configured to receive the image data from the cameras and identify an anatomical object within the image data. For example, processor(s) 514 may be configured to execute image-recognition software to identify an anatomical object within the image data. As shown in FIG. 5, the anatomical object may include a substantially planar resected bone surface 502, configured to receive (e.g., match with) a corresponding planar surface of a prosthetic implant 700 (FIG. 7).

In some examples, processor(s) 514 may be configured to recognize one or more colors of an exposed bone surface from the image data. For example, processor(s) 514 may be configured to recognize a first color of an outer cortical layer of an exposed bone surface, and/or a second color of an inner cancellous section of an exposed bone surface. In some examples, processor(s) 514 may be configured to identify an exposed bone surface from the image data by searching for a particular shape. For example, processor(s) 514 may be configured to recognize a substantially spherical intact humeral head or a substantially circular resected humeral head from within the image data. In some examples, processor(s) 514 may additionally be configured to identify, from the image data, an implant stem 504 implanted within the resected bone surface 502, as well as the respective center 506 of a taper connection 510 of implant stem 504.

Figure 6:
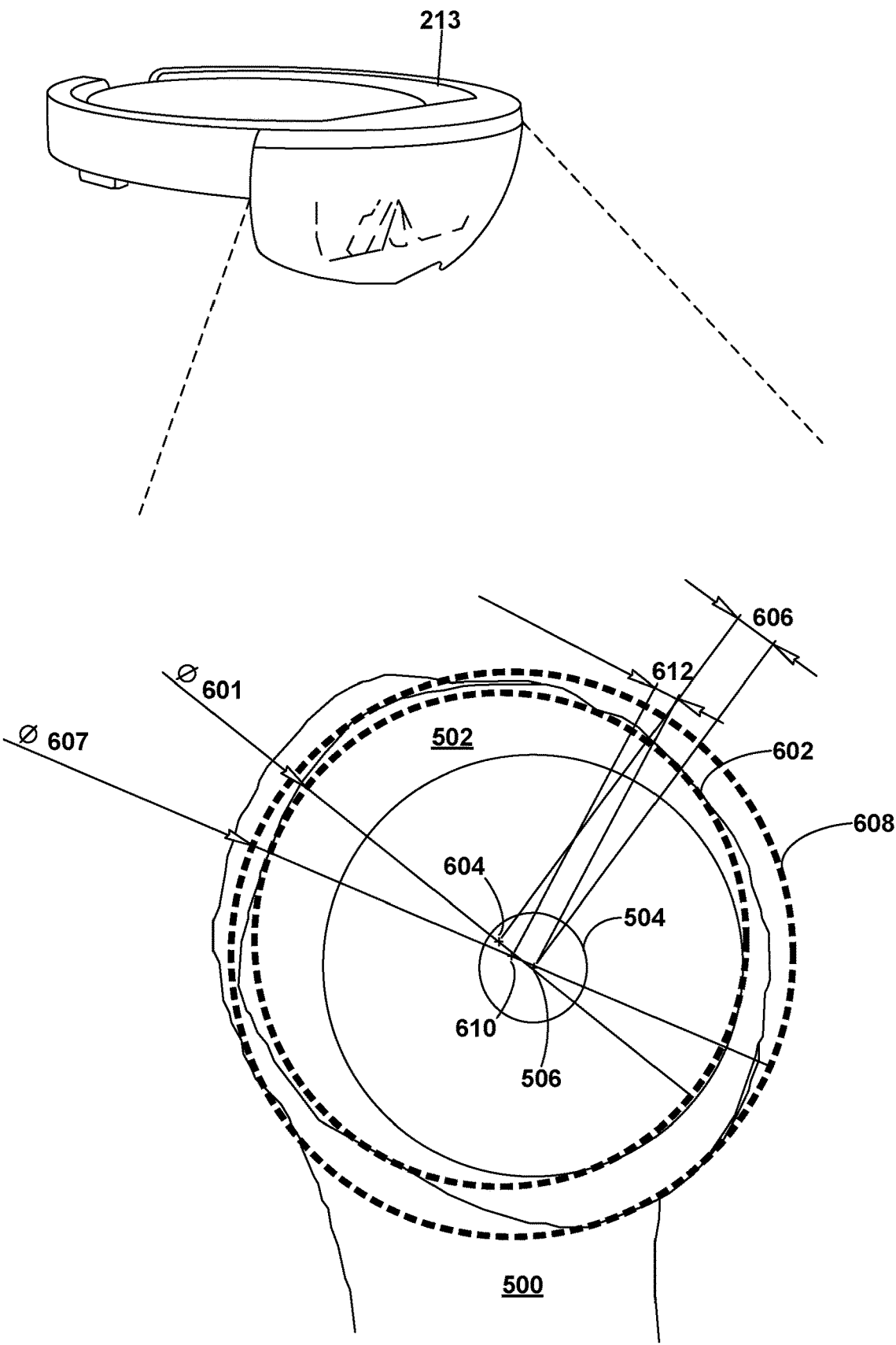
FIG. 6 is a conceptual diagram of an orthopedic surgical system that includes an MR system, according to an example of this disclosure.

As shown in FIG. 6, once visualization device 213 has identified an anatomical object such as a resected bone surface 502 and a center 506 of an implant stem 504, visualization device 213 may further be configured to determine one or more size parameters of the respective bone surface. For example, visualization device 213 may be configured to determine a size (e.g., diameter 601) and relative position of a largest inscribed circle (e.g., an "incircle") 602 that fits entirely within the boundaries of the area of resected bone surface 502. Based on the size and the position of incircle 602, visualization device 213 may additionally identify the center 604 of the incircle (e.g., the "incenter") relative to resected bone surface 502. Visualization device 213 may additionally identify one or more offset values, such as an offset distance 606 and an offset orientation (e.g., angle) between center 506 of implant stem 504 and incenter 604.

Similarly, visualization device 213 may be configured to determine a size (e.g., diameter 607) and relative position of a smallest circumscribed circle (e.g., a "circumcircle") 608 that fits entirely outside the boundaries of the area of resected bone surface 502. Based on the size and the position of circumcircle 608, visualization device 213 may additionally identify the center 610 of the circumcircle (e.g., the "circumcenter") relative to resected bone surface 502. Visualization device 213 may additionally identify one or more offset values, such as an offset distance 612 and an offset orientation (e.g., angle) between center 506 of implant stem 504 and circumcenter 610.

In some examples, visualization device 213 may be configured to display one or more virtual user input devices (e.g., selectable widgets 524 of FIG. 4) through which a user may indicate one or more user preferences to MR system 212. For example, selectable widgets 524 may include virtual devices such as virtual buttons, virtual slider bars, etc., with which an orthopedic surgeon may select or indicate one or more preferences for a relative size, shape, position, and/or orientation for a prosthetic implant device (e.g., implant 700 of FIGS. 7A and 7B). As one example, a surgeon may use selectable widgets 524 to adjust the size of circumcircle 608 in order to indicate a preferred maximum implant size. As another example, a surgeon may use selectable widgets 524 to adjust the size of incircle 602 in order to indicate a preferred minimum implant size. In some examples, incircle 602 and/or circumcircle 608 may include virtual objects with which the user may directly interact. For example, a user may adjust the size, position, and/or orientation of incircle 602 and/or circumcircle 608 with one or more hand gestures, such as by "pinching" or "spreading" the respective circle. In some examples, a surgeon may use selectable widgets 524 to indicate a preferred relative weighting or ranking for a medial-lateral position and/or an anterior-posterior position for a prosthetic implant. In some examples, a surgeon may use selectable widgets 524 or another virtual interface to indicate preferences for other parameters, such as an amount of overhang 702 or underhang 704 (FIGS. 7A and 7B) between bone surface 502 and a prosthetic implant, or an alignment between the implant and bone surface 502 along a particular direction. In some examples, a surgeon may indicate these parameters via a manual input device, such as a keyboard, mouse, touchscreen, etc.

Figure 7B:
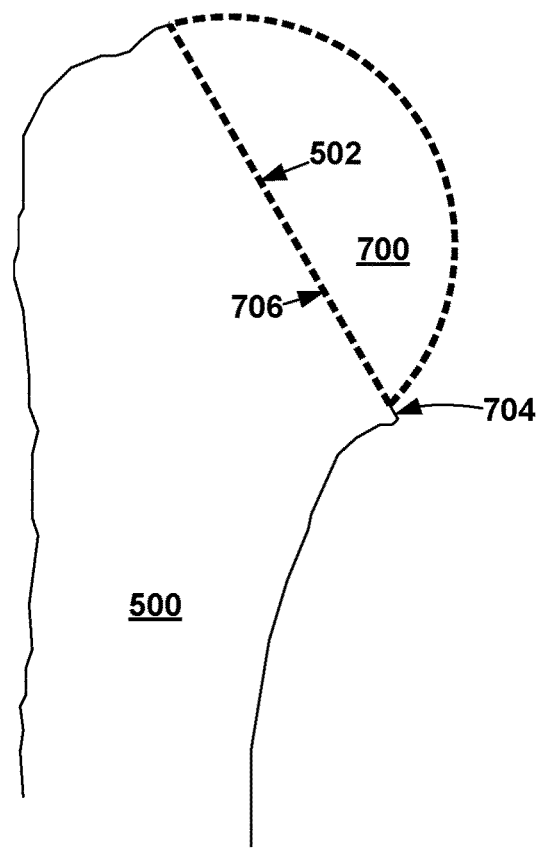

Based on the one or more size parameters of resected bone surface 502, as well as the determined incircle 602 and circumcircle 608 and/or additional surgeon preferences, MR system 212 may be configured to determine (e.g., select, create, or identify) and output for display on visualization device 213 at least one prosthetic implant configured to match resected bone surface 502. For example, as shown in FIGS. 7A and 7B, the prosthetic implant may include a semi-spherical prosthetic humeral head, having a substantially planar circular surface configured to be coupled to (e.g., aligned with) planar resected bone surface 502. As one specific example, processor(s) 514 of visualization device 213 may be configured to retrieve from memory 516 a set of data describing one or more differently sized implants having dimensions constrained to "fit" resected bone surface 502. For example, the diameter of the circular planar surface of the implant may be constrained between the diameters 601 and 607 of incircle 602 and circumcircle 608, respectively.

In some examples, visualization device 213 may be configured to automatically select a "best fit" implant from among a plurality of implants stored in memory 215, such as based on indicated surgeon preferences and/or additional parameters. For example, visualization device 213 may be configured to select an implant that reduces a discrepancy between resected bone surface 502 and planar implant surface 706. For example, a discrepancy between resected bone surface 502 and planar implant surface 706 may include one or more "overhang" regions 702, wherein the implant 700 "hangs over" or extends past resected bone surface 502, as well as one or more "underhang" regions 704, wherein resected bone surface 502 hangs over or extends past implant 700.

In some examples, visualization device 213 may be configured to select an implant 700 that most-closely approximates the native (e.g., premorbid) bone structure. For example, visualization device 213 may determine one or more size dimensions of the native bone structure from received image data, such as from historical x-ray, CT scan, or MRI image data, and select an implant 700 from memory having similar size dimensions.

In some examples in accordance with this disclosure, MR system 213 may be configured to select from memory 215 a plurality of differently sized implants 700, and output a virtual graphical representation of each prosthetic implant for display on transparent screen 520 (FIG. 4) of visualization device 213. For example, a wearer or user of visualization device 213 may observe real-world elements through transparent screen 520, with the virtual implant 700 laid over top of the real world elements either alone or in combination with other additional virtual graphical objects. For example, as shown in FIGS. 7A and 7B, visualization device 213 may be configured to display virtual implant 700 in a fixed position relative to a real observed bone structure, such as the resected surface 502 of humerus 500 of a patient undergoing arthroplasty. In particular, visualization device 213 may be configured to detect (e.g., identify) resected bone surface 502, display virtual implant 700 overtop of resected bone surface 502, and "lock" virtual implant 700 in place with respect to resected bone surface 502. In other words, motion sensors 533 of visualization device 213 (FIG. 4) may be configured to track a motion of visualization device 213 with respect to humerus 500, and update the displayed position of virtual implant 700 with respect to resected bone surface 502, such that virtual implant 700 retains its position relative to humerus 500 as viewed by the user or wearer. For example, visualization device 213 may be configured to "lock" the displayed position of virtual implant 700 with respect to resected bone surface 502 (e.g., a real observed bone structure) through a process called "registration." Visualization device 213 may perform the registration process in two steps: initialization and optimization (e.g., minimization). During initialization, the user of MR system 212 uses the visualization device 213 in conjunction with information derived from the preoperative virtual planning system 102 (FIG. 1), the orientation of the user's head (which provides an indication of the direction of the user's eyes (referred to as "gaze" or "gaze line"), rotation of the user's head in multiple directions, sensor data collected by the sensors 530, 532 and/or 533 (or other acquisitions sensors), and/or voice commands and/or hand gestures to visually achieve an approximate alignment of the virtual implant 700 with an observed bone structure (e.g., resected bone surface 502).

In some examples, preoperative planning system 102, MR system 212, and/or visualization device 213 receives data indicative of virtual implant 700 as well as a virtual model of the target implant site (e.g., resected surface 502 of humerus 500). The data may indicate a fixed location of the virtual implant 700 with respect to the surface 502 of humerus 500. Preoperative planning system 102 identifies a point or region of interest on the surface of the virtual target implant site and a virtual normal vector to the point (or region) of interest on the surface of the region. MR system 212 connects the identified point (or region) of interest to the user's gaze point (e.g., a central point in the field of view of visualization device 213). Thus, when the head of the user of visualization device 213 is then moved or rotated, the virtual target implant site also moves and rotates in space.

In the example of a shoulder arthroplasty procedure, the point of interest on the surface of virtual target implant site can be an approximate center of the resected bone surface 502 that can be determined by using a virtual planning system 102, such as the BLUEPRINT™ planning system. In some examples, the approximate center of the virtual target implant site can be determined using a barycenter find algorithm, with the assistance of machine learning algorithms or artificial intelligence systems, or using another type of algorithm. For other types of bone repair/replacement procedures, other points or regions of the bone can be identified and then connected to the user's gaze line or gaze point.

The ability to move and rotate virtual target implant site in space about the user's gaze point alone generally is not sufficient to orient virtual target implant site with the actual observed bone (e.g., humerus 500). Thus, as part of the initialization procedure, MR system 212 also determines the distance between visualization device 213 and a point (or points) on the surface of the observed bone surface 502 in the field of view of visualization device 213 and the orientation of that surface using sensor data collected from the depth, optical, and motion sensors 530, 532, 533. For example, the orientation of observed bone surface 502 can be approximated by determining a vector that is normal (i.e., perpendicular) to a point (e.g., a central point) on the surface. This normal vector is referred to herein as the "observed normal vector." It should be understood, however, that other bones may have more complex surfaces. For these more complex cases, other surface descriptors may be used to determine orientation.

Regardless of the particular bone, distance information can be derived by MR system 212 from depth camera(s) 532 (FIG. 4). This distance information can be used to derive the geometric shape of the surface of an observed bone 502. That is, because depth camera(s) 532 provide distance data corresponding to any point in a field of view of depth camera(s) 532, the distance to the user's gaze point on the observed bone 504 can be determined. With this information, either visualization device 213 can automatically, or the user can manually, move the virtual target bone model in space and approximately align it with the observed bone 502 at a point or region of interest using the gaze point. That is, when the user shifts gaze to observed bone structure 502, the virtual bone model (which is connected to the user's gaze line) moves with the user's gaze. The user can then align the virtual bone model with observed bone structure 502 by moving the user's head (and thus the gaze line), using hand gestures, using voice commands, and/or using a virtual interface to adjust the position of the virtual bone model. For instance, once the virtual bone model is approximately aligned with observed bone structure 502, the user may provide a voice command (e.g., "set") that causes MR system 212 to capture the initial alignment. The orientation ("yaw" and "pitch") of the 3D model can be adjusted by rotating the user's head, using hand gestures, using voice commands, and/or using a virtual interface which rotate the virtual bone model about the user's gaze line so that an initial (or approximate) alignment of the virtual and observed objects can be achieved. In this manner, the virtual bone model is oriented with the observed bone 502 by aligning the virtual normal vector and the observed normal vector. Additional adjustments of the initial alignment can be performed as needed. For instance, after providing the voice command, the user may provide additional user input to adjust an orientation or a position of the virtual bone model relative to observed bone structure 502. This initial alignment process is performed intraoperatively (or in real time) so that the surgeon can approximately align the virtual and observed bones. In some examples, such as where the surgeon determines that the initial alignment is inadequate, the surgeon may provide user input (e.g., a voice command, such as "reset") that causes MR system 212 to release the initial alignment such that the central point is again locked to the user's gaze line.

When the user detects (e.g., sees) that an initial alignment of the virtual bone model with observed bone structure 502 has been achieved (at least approximately), the user can provide an audible or other perceptible indication to inform MR system 212 that a fine registration process (i.e., execution of an optimization (e.g., minimization) algorithm) can be started. For instance, the user may provide a voice command (e.g., "match") that causes MR system 212 to execute a minimization algorithm to perform the fine registration process. The optimization process can employ any suitable optimization algorithm (e.g., a minimization algorithm such as an Iterative Closest Point or genetic algorithm) to perfect alignment of the virtual bone model with observed bone structure 502. Upon completion of execution of the optimization algorithm, the registration procedure is complete. The registration process may result in generation of a transformation matrix that then allows for translation along the x, y, and z axes of the virtual bone model and rotation about the x, y and z axes in order to achieve and maintain alignment between the virtual and observed bones.

In some examples, once the registration of the combined virtual implant model 700 and virtual bone model has been completed, the surgeon may elect to command MR system 212 (e.g., visualization device 213) to stop displaying the virtual bone model, and instead, only display the virtual implant model 700 fixed relative to the actual observed bone 502, as shown in FIGS. 7A and 7B. For example, visualization device 213 may be configured to directly display virtual implant model 700 "locked" in position (e.g., registered) with respect to observed resected surface 502 of humerus 500, without displaying the virtual bone model.

By displaying virtual implant model 700 intraoperatively, the techniques of this disclosure may improve the alignment of a prosthetic implant by allowing an orthopedic surgeon to select and align an implant that is customized to fit the specific patient. For example, once virtual implant model 700 is registered with (e.g., fixed with respect to) observed resected bone surface 502, visualization device 213 may be configured to allow a user, such as a surgeon, to customize (e.g., adjust) an alignment of each virtual implant model 700 relative to resected bone surface 502. For example, visualization device 213 may be configured to receive user input, such as by detecting a hand gesture or receiving verbal cues, indicating a change in position of virtual implant model 700 relative to resected bone surface 502. After adjusting for the indicated change, visualization device 700 may re-register the virtual implant model 700 to lock virtual implant model 700 in place with respect to resected bone surface 502. In doing so, visualization device 213 may allow the surgeon to observe and select a preferred customized position for virtual implant model 700.

In some examples, visualization device 213 may be configured to display both virtual implant model 700, as well as a virtual representation of the patient's native or premorbid bone structure, including the resected bone surface 502. For example, based on data, such as CT scan data, x-ray data, or other imaging data, MR system 212 may be configured to generate a virtual model of the patient's premorbid bone structure and output the virtual premorbid bone model for display on visualization device 213. Using a side-by-side comparison of the virtual premorbid bone model and virtual implant model 700, a surgeon may visually determine (e.g., select or confirm) a particular virtual implant model 700 that is most similar to the patient's premorbid bone structure.

In some examples, visualization device 213 may be configured to display additional surgical guidance information configured to guide a surgeon through performing the surgical operation, including coupling the prosthetic implant to the resected bone surface 502. For example, upon adjusting the relative position of virtual implant model 700 with respect to resected bone surface 502 based on user input, visualization device 213 may additionally determine an offset between the center of the new position of virtual implant model 700 and the center 506 of implant stem 504. For example, as described with respect to FIG. 6 above, visualization device 213 may determine both an offset distance and an offset orientation between the respective centers. As shown in FIGS. 8A and 8B, based on the offset distance and the offset orientation, visualization device 213 may further determine (e.g., select) a particular size for an offset adaptor 800 configured to affix the prosthetic implant to the implant stem 504. Visualization device 213 be configured to output a visible and/or audible indication 801 of the selected sized offset adaptor 800 (e.g., as a recommendation). In some examples visualization device 213 may further output indications 806, 808 that may assist the surgeon to properly orient the offset adaptor 800 with respect to resected bone surface 502.

In some examples, offset adaptor 800 may be configured to rotate about the center 506 of implant stem 504, and offset adaptor 800 may include a notch 802, or any other suitable indicator, to indicate a relative alignment angle of offset adaptor 800. In some examples, but not all examples, the indicator of the relative alignment angle of offset adaptor 800 can be provided by a structural feature of offset adapter 800, such as notch 802. In other examples, the indicator of relative alignment angle can be provided in other ways, such as via a marking on the surface of offset adaptor 800, or, in some examples, via a virtual marking output by visualization device 213 that can appear to the user as if the virtual marking is on, at, or part of offset adapter 800. In some of such examples, visualization device 213 may output one or more graphical elements to indicate an alignment status of offset adaptor 800. As one example, visualization device 213 may output a visual indicator, such as arrow 804, indicating a "correct" alignment angle for offset adaptor 800. The offset adaptor may be considered to be in the "correct" alignment when arrow 804 points directly at notch 802. As another example, visualization device 213 may output a visual indication when offset adaptor 800 is in an "incorrect" alignment, such as the "X" shape 806 (FIG. 8A), as well as a visual indication when the offset adaptor 800 is in the "correct" alignment, such as the "check mark" indicator 808 (FIG. 8B). Once the surgeon has aligned offset adaptor 800 in the correct orientation according to the additional surgical guidance information, the surgeon may affix the selected prosthetic implant to offset adaptor 800.

Figure 9:
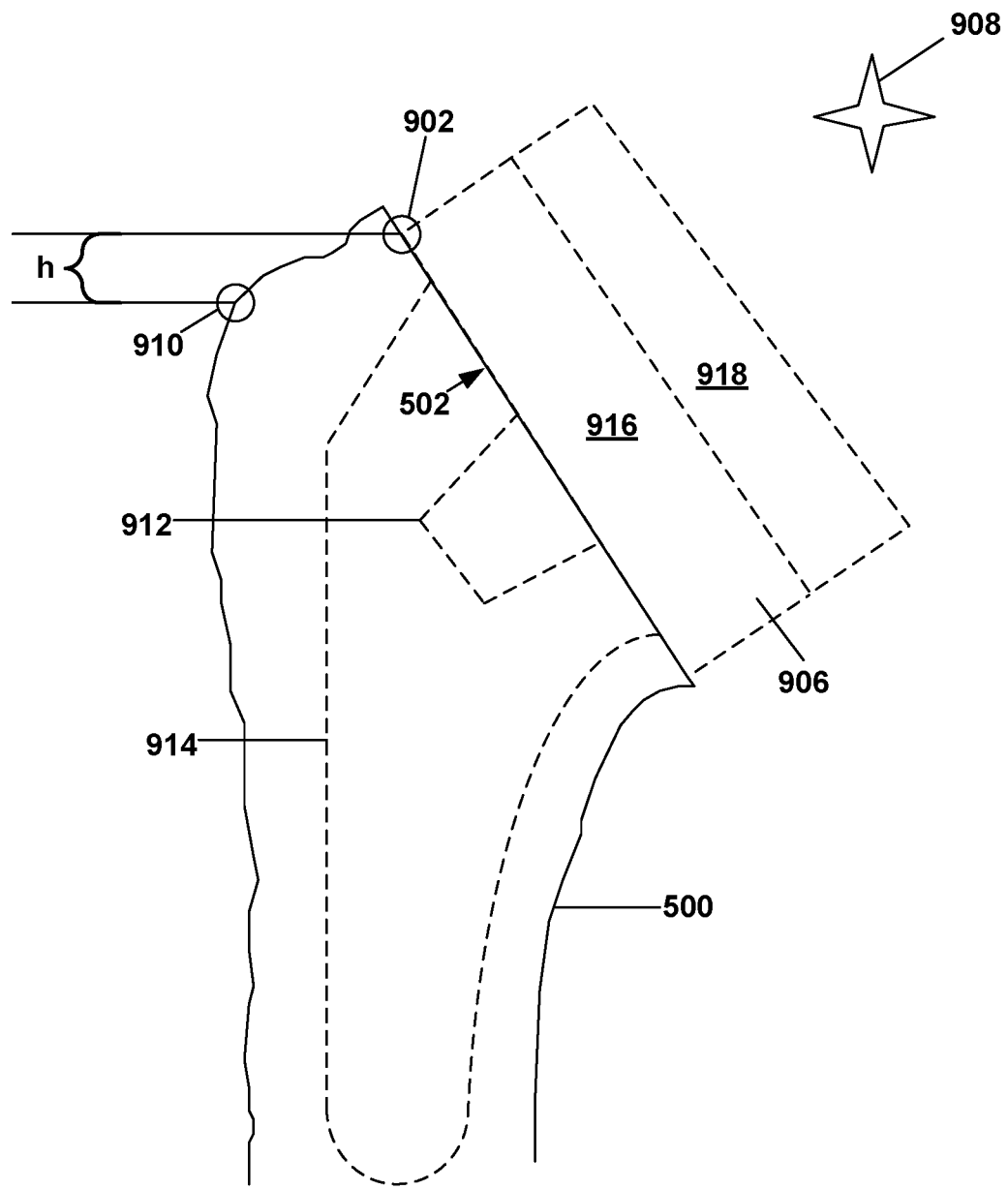

FIG. 9 is a conceptual diagram including one or more example overlaid graphical user interface (GUI) elements that MR system 212 may generate and display on visualization device 213 (FIG. 4), in accordance with one or more techniques of this disclosure. In particular, FIG. 9 depicts a humerus 500 undergoing a reversed shoulder arthroplasty (RSA), as detailed further above.

As shown in FIG. 9, in some examples, visualization device 213 may be configured to intraoperatively display one or more graphical elements relative to humerus 500 during an RSA. For example, visualization device 213 may be configured to display a virtual implant 906 relative to humerus 500 viewable via a transparent screen 520 of visualization device 213. In the example of FIG. 9, virtual implant 906 includes offset tray 916, insert 918 (such as a polyethylene insert) and taper connection 912. Similar virtual planning techniques to those described above with respect to standard or "anatomical" shoulder arthroplasty procedures may also apply with regard to RSA procedures. For example, visualization device 213 may be configured to identify, from received image data depicting an exposed surgical site, a target implant site (e.g., a resected bone surface 502 of humerus 500), register a virtual prosthetic implant 906 to the target implant site as detailed further above, and output for display virtual prosthetic implant 906 in a fixed position relative to the target implant site. For example, the fixed position may include both a relative location and a relative orientation with respect to the target implant site.

In some examples, MR system 212 may receive user input allowing a surgeon to adjust (e.g., customize) the size, shape, position, orientation, or alignment of any or all of the virtual elements displayed on visualization device 213. For example, MR system 212 may receive user input, such as by detecting hand gestures, virtual input devices, etc., allowing a surgeon to adjust a position of virtual implant 906 along the plane of resected bone surface 502. For example, taper connection 912 may be offset from the center of tray 916, such that a rotation angle of taper connection 912 adjusts an alignment of implant 906 relative to resected bone surface 502. In some examples, MR system 212 may select a rotation angle for implant 906 that causes implant 906 to be approximately centered relative to resected bone surface 502 (e.g., a rotation angle that does not result in a substantial overhang or underhang between resected bone surface 502 and tray 916 along any one particular circumferential region).

In some examples, MR system 213 may receive user input enabling a surgeon to customize a "height" of virtual implant 906 relative to resected bone surface 502. For example, the surgeon may adjust one or more size and/or position parameters of offset tray 916 and/or insert 918 (e.g., along the anterior-posterior plane). In some examples, visualization device 213 may display a graphical element indicating a reconstruction distance or height h between high point 902 of virtual implant 906 and high point 910 on the greater tuberosity of humerus 500, allowing a surgeon to further virtually plan the RSA procedure. For example, a surgeon may indicate a preference to reduce or minimize the reconstruction height h such that the high point 902 on reverse tray 916 is approximately aligned (e.g., along a horizontal axis) with greater tuberosity 910. MR system 212 may be configured to automatically determine and indicate a rotation angle for implant 906 that reduces or minimizes this parameter h.

In some examples, MR system 212 may be configured to register (as detailed further above) a virtual humeral stem 914 to a physical humeral stem already implanted within humerus 500 and display the virtual humeral stem 914 as a further visual aid for determining a size and/or alignment of virtual implant 906. For example, based on a visible portion of the physical humeral stem (e.g., a planar portion viewable along resected bone surface 502) and/or additional user input, MR system 212 may determine an approximate location of the physical humeral stem and output for display on visualization device 213 a corresponding virtual implanted humeral stem 914 relative to humerus 500, e.g., with humeral stem 814 displayed "inside of" humerus 500 as though humerus 500 were transparent. The displayed virtual humeral stem 914 may further enable the surgeon to customize a location, size, and/or orientation for virtual implant 906 by indicating the approximate location of virtual taper connection 912 within virtual stem 914.

In some examples, MR system 212 may generate and output for display on visualization device 213 additional surgical guidance information in order to assist a user to select a respective size and relative position for virtual implant 906. For example, as shown in FIG. 9, MR system 212 may determine and output for display a virtual center of rotation 908 of the repaired joint, which may inform the user (e.g., the surgeon) of a projected range of motion of the repaired joint based on the selected relative size, position, and/or orientation of virtual implant 906.

Figure 10:
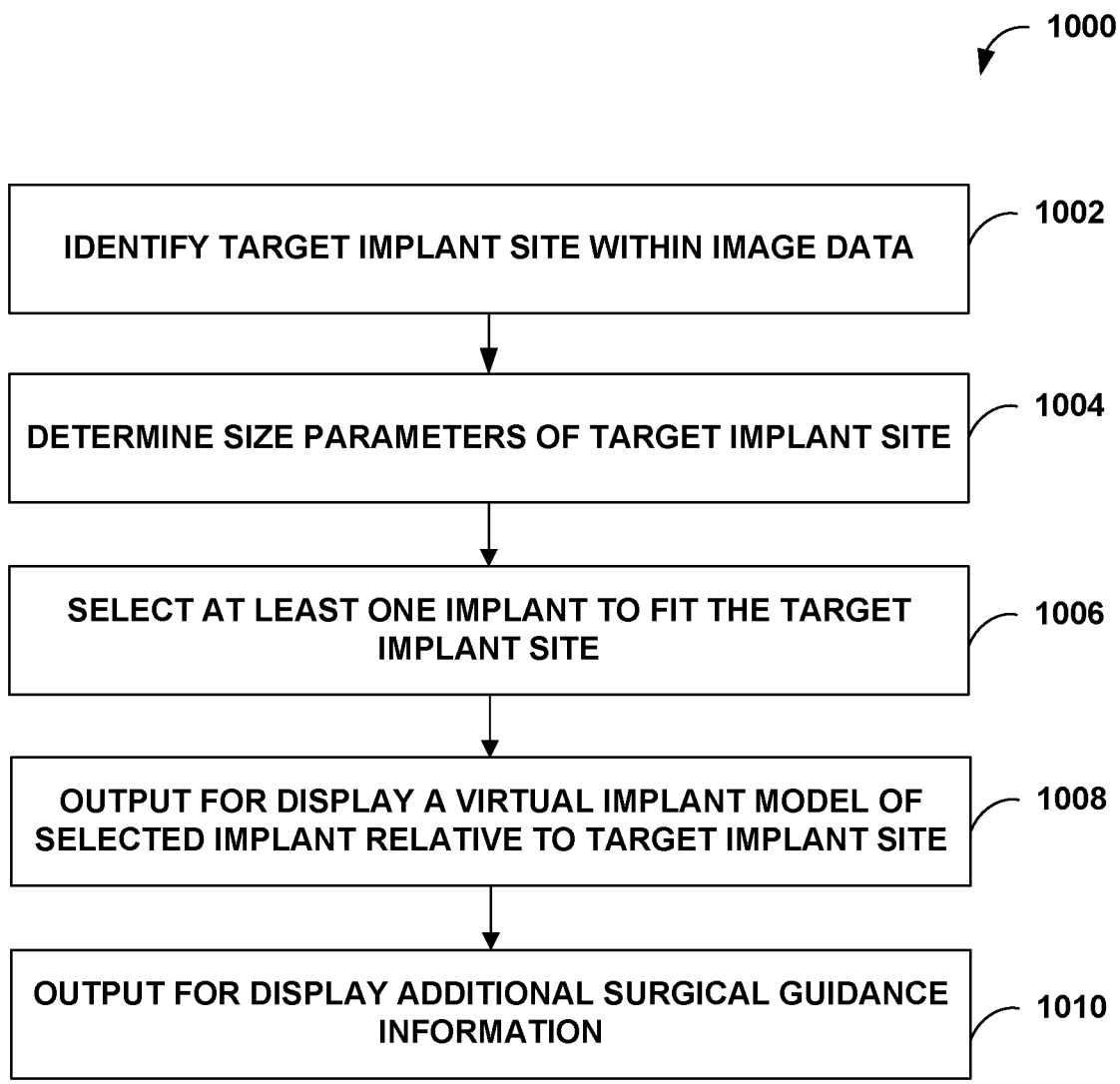
FIG. 10 is a flowchart illustrating example methods of operations in accordance with one or more example techniques described in this disclosure.

FIG. 10 is a flowchart illustrating an example method of operation 1000 in accordance with one or more techniques described in this disclosure. Although the techniques of FIG. 10 are described with respect to MR system 212 of FIG. 2 and visualization device 213 of FIG. 4, the techniques may be performed by any appropriate system and/or virtual-reality display device.

MR system 212 may receive image data, such as from one or more cameras, depicting a target site to affix a prosthetic implant. For example, the target site may include one or more anatomical objects, such as a resected bone surface 502. Using image-recognition software, visualization device 213 may identify the target site within the image data (1002).

Based on the identified target site, MR system 212, using one or more sensors, may determine one or more size parameters or other measurements of the target implant site (1004). For example, visualization device 213 may determine a length or width of the target implant site, or may determine a size and relative position for a circle that either fits entirely within (e.g., an incircle) or outside of (e.g., a circumcircle) the target implant site.

Based on the determined size parameters, MR system 212 may determine at least one prosthetic implant device configured to "fit" or match the target implant site (1006). For example, visualization device 213 may retrieve from memory 215 a plurality of differently sized prosthetic implants each having size parameters within a predetermined range based on the determine size parameters of the target implant site.

For each of the selected prosthetic implants, MR system 212 may be configured to output for display a virtual model 700 of the respective implant. The virtual implant model 700 may be displayed on a transparent display screen 520 and "fixed" in a position relative to the target implant site viewable through the display screen (1008). For example, visualization device 213 may display virtual implant model 700 in a relative position with respect to the position of the target implant site of the patient such that the hologram appears directly over the top of the target site. Visualization device 213 may further track the motion of transparent screen 520 with respect to the target implant site so that it may "update" the display of virtual implant model 700 so that the virtual model appears "locked" in place with respect to the implant site. While each virtual implant model 700 is displayed on transparent screen 500, visualization device may receive user input indicating an intended change in position of virtual implant model 700 relative to the target implant site. For example, a surgeon or other user of MR system 212 may "customize" the alignment according to personal preferences (e.g., professional opinions).

In some examples, MR system 212 may output additional surgical guidance information (1010). For example, based on a selected prosthetic implant size and alignment, visualization device 213 may output visible and/or audible indications to assist the surgeon to precisely align the selected implant to the selected alignment. For example, visualization device 213 may output an indication of a recommended offset adaptor size and orientation configured to connect the selected prosthetic implant to a stem implanted within the target implant site.

The following examples are described herein. Example 1: A system for guiding a joint replacement surgery, the system comprising a visualization device comprising one or more sensors; and processing circuitry configured to: determine, based on data generated by the one or more sensors, one or more size parameters of a bone resection surface viewable via the visualization device; select, based on the one or more size parameters of the bone resection surface and from a plurality of implants, an implant; and output for display, via the visualization device, a graphical representation of the selected implant relative to the bone resection surface.

Example 2: The system of example 1, wherein, to select the implant, the processing circuitry is further configured to: determine, based on the one or more size parameters, a diameter of the implant and a position of the implant relative to the bone resection surface; identify, based on data generated by the one or more sensors, a center of a taper connection of an implant stem implanted within the bone resection surface; and determine, based on the position and the identified center, one or more offset values for the selected implant.

Example 3: The system of example 2, wherein the one or more offset values comprise an offset distance and an offset orientation.

Example 4: The system of example 2 or example 3, wherein the one or more offset values comprise an offset adaptor size.

Example 5: The system of any of examples 1-4, wherein the visualization device comprises a see-through holographic lens configured to display the graphical representation as a hologram.

Example 6: The system of any of examples 1-5, the processing circuitry further configured to output for display, via the visualization device, a graphical representation of a native resected bone, including the bone resection surface, relative to the graphical representation of the implant.

Example 7: The system of any of examples 1-6, the processing circuitry further configured to determine a change in position of the visualization device relative to the bone resection surface; and update the display of the graphical representation of the selected implant in response to determining the change in position so as to maintain a position of the graphical representation relative to the bone resection surface.

Example 8: The system of any of examples 1-7, wherein the bone resection surface comprises a humeral resection surface; and the plurality of implants comprise prosthetic humeral heads.

Example 9: The system of any of examples 1-8, the processing circuitry further configured to output for display additional surgical guidance information.

Example 10: The system of example 9, wherein the additional surgical guidance information comprises a graphical element indicating a correct offset orientation of an offset adaptor.

Example 11: The system of example 10, wherein the graphical element comprises an arrow having a color indicative of the correct offset orientation.

Example 12: A method for guiding a joint replacement surgery, the method comprising determining one or more size parameters of a bone resection surface viewable via a visualization device; selecting, based on the one or more size parameters of the bone resection surface and from a plurality of implants, an implant; and outputting for display, via the visualization device, a graphical representation of the selected implant relative to the bone resection surface.

Example 13: The method of example 12, wherein selecting the implant comprises: determining, based on the one or more size parameters, a diameter of the implant; identifying a center of a taper connection of an implant stem within the bone resection surface; and determining, based on the identified center, an offset value for the selected implant.

Example 14: The method of example 13, wherein the offset value comprises an offset distance and an offset orientation.

Example 15: The method of example 13 or example 14, wherein the offset value comprises an offset adaptor size.

Example 16: The method of any of examples 12-15, further comprising outputting for display, via the visualization device, a graphical representation of a native resected bone relative to the graphical representation of the selected implant.

Example 17: The method of any of examples 12-16, further comprising determining a change in position of the visualization device relative to the bone resection surface; and updating the display of the graphical representation of the selected implant in response to determining the change in position so as to maintain a position of the graphical representation relative to the bone resection surface.

Example 18: The method of any of examples 12-17, wherein the bone resection surface comprises a humeral resection surface; and the plurality of implants comprise prosthetic humeral heads.

Example 19: The method of any of examples 12-18, further comprising outputting for display additional surgical guidance information.

Example 20: The method of example 19, wherein the additional surgical guidance information comprises a graphical element indicating a correct offset orientation of an offset adaptor.

Example 21: The method of example 20, wherein the additional surgical guidance information comprises an arrow having a color indicative of the correct offset orientation.

Example 22: A system for guiding a joint replacement surgery, the system comprising: means for determining one or more size parameters of a bone resection surface viewable via a visualization device; means for selecting, based on the one or more size parameters of the bone resection surface and from a plurality of implants, an implant; and means for outputting for displaying a graphical representation of the selected implant relative to the bone resection surface.

Example 23: The system of example 22, further comprising means for performing the method of any of examples 12-21.

Example 24: A computer-readable storage medium storing instructions that when executed cause one or more processors to determine one or more size parameters of a bone resection surface viewable via a visualization device; select, based on the one or more size parameters of the bone resection surface and from a plurality of implants, an implant; and output for display a graphical representation of the selected implant relative to the bone resection surface.

Example 25: The computer-readable storage medium of example 24, further comprising instructions that cause the one or more processors to perform the method of any of examples 12-21.

While the techniques been disclosed with respect to a limited number of examples, those skilled in the art, having the benefit of this disclosure, will appreciate numerous modifications and variations there from. For instance, it is contemplated that any reasonable combination of the described examples may be performed. It is intended that the appended claims cover such modifications and variations as fall within the true spirit and scope of the invention.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Operations described in this disclosure may be performed by one or more processors or processing circuitry, which may be implemented as fixed-function processing circuits, programmable circuits, or combinations thereof, such as one or more digital signal processors (DSPs), general purpose microprocessors, application specific integrated circuits (ASICs), field programmable gate arrays (FPGAs), or other equivalent integrated or discrete logic circuitry. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute instructions specified by software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. Accordingly, the terms "processor" and "processing circuity," as used herein may refer to any of the foregoing structures or any other structure suitable for implementation of the techniques described herein.

Various examples have been described. These and other examples are within the scope of the following claims.

The invention claimed is:

1. A system for intraoperatively guiding a joint replacement surgery, the system comprising:
   a mixed reality (MR) visualization device comprising one or more sensors, the MR visualization device being configured to display one or more graphical representations of one or more circles associated with boundaries of a bone resection surface overlaid relative to the bone resection surface; and
   processing circuitry configured to:
      determine, based on image data generated by the one or more sensors, one or more size parameters of the bone resection surface viewable via the MR visualization device, the one or more size parameters comprising one or more of:
         one or more diameters of the one or more circles; or
         one or more centers of the one or more circles;
      select, based on the one or more size parameters of the bone resection surface and from a plurality of implants, an implant, wherein to select the implant, the processing circuitry is configured to:
         determine, based on the one or more size parameters, a diameter of the implant and a position of the implant relative to the bone resection surface;
      identify, based on the image data generated by the one or more sensors, a center of a taper connection of an implant stem implanted within the bone resection surface;
      determine, based on the position and the center of the taper connection, one or more offset values for the implant, the one or more offset values comprising values for an offset adaptor configured to couple the implant to the implant stem; and
      output for display, via the MR visualization device, a graphical representation of the implant overlaid relative to the bone resection surface.

2. The system of claim 1, wherein the one or more offset values comprise an offset distance and an offset orientation.

3. The system of claim 1, wherein the one or more offset values comprise an offset adaptor size.

4. The system of claim 1, wherein the MR visualization device comprises a see-through holographic lens configured to display the graphical representation of the implant as a hologram.

5. The system of claim 1, the processing circuitry further configured to output for display, via the MR visualization device, a graphical representation of a native resected bone, including the bone resection surface, relative to the graphical representation of the implant.

6. The system of claim 1, the processing circuitry further configured to:
   determine a change in position of the MR visualization device relative to the bone resection surface; and
   update the display of the graphical representation of the implant in response to determining the change in position so as to maintain a position of the graphical representation of the implant overlaid relative to the bone resection surface.

7. The system of claim 1, wherein:
   the bone resection surface comprises a humeral resection surface; and
   the plurality of implants comprises prosthetic humeral heads.

8. The system of claim 1, the processing circuitry further configured to output for display additional surgical guidance information.

9. The system of claim 8, wherein the additional surgical guidance information comprises a graphical element indicating a correct offset orientation of the offset adaptor.

10. The system of claim 9, wherein the graphical element comprises an arrow having a color indicative of the correct offset orientation.

11. The system of claim 1, wherein the one or more graphical representations of the one or more circles associated with the boundaries of the bone resection surface overlaid relative to the bone resection surface comprise one or more of:
   a graphical representation of a largest inscribed circle that fits entirely within the boundaries of the bone resection surface overlaid relative to the bone resection surface; or
   a graphical representation of a smallest circumscribed circle that fits entirely outside the boundaries of the bone resection surface overlaid relative to the bone resection surface.

12. A method for intraoperatively guiding a joint replacement surgery, the method comprising:
   displaying, via a mixed reality (MR) visualization device, one or more graphical representations of one or more circles associated with boundaries of a bone resection surface overlaid relative to the bone resection surface;
   determining, based on image data generated by one or more sensors of the MR visualization device, one or more size parameters of the bone resection surface viewable via the MR visualization device, wherein the one or more size parameters comprise one or more of:
      one or more diameters of the one or more circles; or
      one or more centers of the one or more circles;
   selecting, based on the one or more size parameters of the bone resection surface and from a plurality of implants, an implant, wherein selecting the implant comprises:
      determining, based on the one or more size parameters, a diameter of the implant and a position of the implant relative to the bone resection surface;
   identifying, based on the image data generated by the one or more sensors of the MR visualization device, a center of a taper connection of an implant stem implanted within the bone resection surface;
   determining, based on the position and the center of the taper connection, one or more offset values for the implant, the one or more offset values comprising values for an offset adaptor configured to couple the implant to the implant stem; and
   outputting for display, via the MR visualization device, a graphical representation of the implant overlaid relative to the bone resection surface.

13. The method of claim 12, wherein the one or more offset values comprise an offset distance and an offset orientation.

14. The method of claim 12, wherein the one or more offset values comprise an offset adaptor size.

15. The method of claim 12, further comprising outputting for display, via the MR visualization device, a graphical representation of a native resected bone including the bone resection surface relative to the graphical representation of the implant.

16. The method of claim 12, further comprising:
determining a change in position of the MR visualization device relative to the bone resection surface; and
updating the graphical representation of the implant in response to determining the change in position so as to maintain a position of the graphical representation of the implant overlaid relative to the bone resection surface.

17. The method of claim 12, wherein:
the bone resection surface comprises a humeral resection surface; and
the plurality of implants comprises prosthetic humeral heads.

18. The method of claim 12, further comprising outputting for display additional surgical guidance information.

19. The method of claim 18, wherein the additional surgical guidance information comprises a graphical element indicating a correct offset orientation of the offset adaptor.

20. The method of claim 19, wherein the additional surgical guidance information comprises an arrow having a color indicative of the correct offset orientation.

21. A non-transitory computer-readable storage medium storing instructions that when executed cause one or more processors to:
determine one or more size parameters of a bone resection surface viewable via a mixed reality (MR) visualization device based on image data generated by one or more sensors of the MR device, the one or more size parameters comprising one or more of:
one or more diameters of one or more circles, the one or more circles comprising graphical representations associated with boundaries of the bone resection surface displayed via the MR visualization device and overlaid relative to the bone resection surface; or
one or more centers of the one or more circles;
select, based on the one or more size parameters of the bone resection surface and from a plurality of implants, an implant, wherein to select the implant, the one or more processors are configured to:
determine, based on the one or more size parameters, a diameter of the implant and a position of the implant relative to the bone resection surface;
identify, based on the image data generated by the one or more sensors of the MR visualization device, a center of a taper connection of an implant stem implanted within the bone resection surface;
determine, based on the position and the center of the taper connection, one or more offset values for the implant, the one or more offset values comprising values for an offset adaptor configured to couple the implant to the implant stem; and
output for display a graphical representation of the implant relative to the bone resection surface.

* * * * *